US 8,727,867 B2

(12) United States Patent
Kane et al.

(10) Patent No.: US 8,727,867 B2
(45) Date of Patent: May 20, 2014

(54) METHOD AND APPARATUS FOR CONDUCTING A FIRST AND SECOND LEVEL GAME AND A GAME OF CHANCE

(75) Inventors: Steven N. Kane, Brookline, MA (US); Dow K. Hardy, Marlborough, MA (US); Mark E. Herrmann, Wellesley, MA (US); Paul LaRocca, Westport, CT (US); Bijan Sabet, Sudbury, MA (US); Jason Yanowitz, Amherst, MA (US)

(73) Assignee: Scientific Games Holdings Limited, Ballymahon, Co. Longford (IE)

( * ) Notice: Subject to any disclaimer, the term of this patent is extended or adjusted under 35 U.S.C. 154(b) by 1313 days.

(21) Appl. No.: 11/027,007

(22) Filed: Dec. 30, 2004

(65) Prior Publication Data
US 2005/0250574 A1 Nov. 10, 2005

Related U.S. Application Data

(60) Provisional application No. 60/569,030, filed on May 7, 2004.

(51) Int. Cl.
*A63F 13/00* (2014.01)
(52) U.S. Cl.
USPC .............. 463/25; 463/15; 463/29; 463/42
(58) Field of Classification Search
CPC ....................... G07F 17/3267; G07F 17/329
USPC ................. 463/16–22, 25, 30, 42, 43
See application file for complete search history.

(56) References Cited

U.S. PATENT DOCUMENTS

| | | |
|---|---|---|
| 2,544,961 A | 3/1951 | Kemp |
| 4,215,864 A | 8/1980 | Nichols |
| 4,494,197 A | 1/1985 | Troy et al. |
| 4,582,324 A | 4/1986 | Koza et al. |
| 4,679,789 A | 7/1987 | Okada |
| 4,689,742 A | 8/1987 | Troy et al. |
| 4,725,079 A | 2/1988 | Koza et al. |
| 4,764,666 A | 8/1988 | Bergeron |
| 4,856,787 A | 8/1989 | Itkis |
| 4,882,473 A | 11/1989 | Bergeron et al. |

(Continued)

FOREIGN PATENT DOCUMENTS

| | | |
|---|---|---|
| CA | 2338080 A1 | 9/2001 |
| EP | 1746550 A2 | 1/2007 |

(Continued)

OTHER PUBLICATIONS

Rules of Pai Gow Poker. Casino City. Dec. 3, 2000. Online: http://web.archive.org/web/20001203170300/http://www.casinocity.com/rules/paigow.htm.

(Continued)

*Primary Examiner* — Dmitry Suhol
*Assistant Examiner* — Andrew Kim
(74) *Attorney, Agent, or Firm* — Dority & Manning, P.A.

(57) ABSTRACT

A system and method are provided for playing a game of chance. The game of chance may include, for example, a lottery-type game. A result of the game of chance is revealed to a player in another medium. In one example, the result is revealed during multiple game instances of one or more online games. In one example, the online game includes a maze-based game similar to the well-known game of PAC-MAN.

57 Claims, 7 Drawing Sheets

(56) References Cited

U.S. PATENT DOCUMENTS

| | | |
|---|---|---|
| 4,922,522 A | 5/1990 | Scanlon |
| 5,158,293 A | 10/1992 | Mullins |
| 5,324,035 A | 6/1994 | Morris et al. |
| 5,351,970 A | 10/1994 | Fioretti |
| 5,373,440 A | 12/1994 | Cohen |
| 5,377,975 A | 1/1995 | Clapper, Jr. |
| 5,398,932 A | 3/1995 | Eberhardt et al. |
| 5,429,361 A | 7/1995 | Raven |
| 5,445,391 A | 8/1995 | Gleason, Jr. |
| 5,518,253 A | 5/1996 | Pocock et al. |
| 5,569,082 A | 10/1996 | Kaye |
| 5,586,937 A | 12/1996 | Menashe |
| 5,611,729 A | 3/1997 | Schumacher |
| 5,628,684 A | 5/1997 | Bouedec |
| 5,645,485 A | 7/1997 | Clapper, Jr. |
| 5,653,635 A | 8/1997 | Breeding |
| 5,687,971 A | 11/1997 | Khaladkar |
| 5,709,603 A | 1/1998 | Kaye |
| 5,722,891 A | 3/1998 | Inoue |
| 5,749,784 A | 5/1998 | Clapper, Jr. |
| 5,768,382 A | 6/1998 | Schneier et al. |
| 5,772,511 A | 6/1998 | Smeltzer et al. |
| 5,775,993 A | 7/1998 | Fentz |
| 5,779,549 A | 7/1998 | Walker et al. |
| 5,788,573 A | 8/1998 | Baerlocher et al. |
| 5,791,990 A | 8/1998 | Schroeder et al. |
| 5,791,991 A | 8/1998 | Small |
| 5,797,795 A | 8/1998 | Takemoto |
| 5,810,664 A | 9/1998 | Clapper, Jr. |
| 5,816,918 A | 10/1998 | Kelly et al. |
| 5,823,873 A | 10/1998 | Moody |
| 5,823,874 A | 10/1998 | Adams |
| 5,830,069 A | 11/1998 | Soltesz et al. |
| 5,848,932 A | 12/1998 | Adams |
| 5,860,653 A | 1/1999 | Jacobs |
| 5,871,398 A | 2/1999 | Schneier |
| 5,882,258 A | 3/1999 | Kelly et al. |
| 5,887,906 A | 3/1999 | Sultan |
| 5,928,082 A | 7/1999 | Clapper, Jr. et al. |
| 5,944,606 A | 8/1999 | Gerow |
| 5,954,582 A | 9/1999 | Zach et al. |
| 5,970,143 A * | 10/1999 | Schneier et al. ............. 713/181 |
| 5,980,385 A | 11/1999 | Clapper |
| 5,996,997 A | 12/1999 | Kamille |
| 6,007,426 A | 12/1999 | Kelly et al. |
| 6,012,983 A | 1/2000 | Walker et al. |
| 6,015,344 A | 1/2000 | Kelly et al. |
| 6,024,640 A | 2/2000 | Walker et al. |
| 6,028,920 A | 2/2000 | Carson |
| 6,044,135 A | 3/2000 | Katz |
| 6,048,269 A | 4/2000 | Burns et al. |
| 6,056,289 A | 5/2000 | Clapper |
| 6,059,289 A | 5/2000 | Vancura |
| 6,077,163 A | 6/2000 | Walker et al. |
| 6,106,393 A | 8/2000 | Sunaga et al. |
| 6,113,495 A | 9/2000 | Walker et al. |
| 6,146,272 A | 11/2000 | Walker et al. |
| 6,152,823 A | 11/2000 | Lacoste et al. |
| 6,159,097 A | 12/2000 | Gura |
| 6,162,121 A | 12/2000 | Morro et al. |
| 6,168,521 B1 | 1/2001 | Luciano et al. |
| 6,173,267 B1 | 1/2001 | Cairns |
| 6,179,711 B1 | 1/2001 | Yoseloff |
| 6,186,892 B1 | 2/2001 | Frank et al. |
| 6,193,608 B1 | 2/2001 | Walker |
| 6,203,011 B1 | 3/2001 | Nulph et al. |
| 6,203,427 B1 | 3/2001 | Walker et al. |
| 6,236,900 B1 | 5/2001 | Geiger |
| 6,241,606 B1 | 6/2001 | Riendeau et al. |
| 6,244,958 B1 | 6/2001 | Acres et al. |
| 6,251,017 B1 * | 6/2001 | Leason et al. ................... 463/42 |
| 6,270,406 B1 | 8/2001 | Sultan |
| 6,273,817 B1 | 8/2001 | Sultan |
| 6,279,911 B1 | 8/2001 | Cherry |
| 6,280,325 B1 | 8/2001 | Fisk |
| RE37,371 E | 9/2001 | Gerow |
| 6,283,855 B1 | 9/2001 | Bingham |
| 6,287,197 B1 | 9/2001 | Dickinson |
| 6,302,793 B1 | 10/2001 | Fertitta et al. |
| 6,309,298 B1 | 10/2001 | Gerow |
| 6,311,976 B1 | 11/2001 | Yoseloff et al. |
| 6,312,334 B1 | 11/2001 | Yoseloff |
| 6,358,151 B1 | 3/2002 | Enzminger et al. |
| 6,364,765 B1 | 4/2002 | Walker et al. |
| 6,364,766 B1 | 4/2002 | Anderson |
| 6,368,214 B1 | 4/2002 | Luciano |
| 6,368,218 B2 | 4/2002 | Angell, Jr. |
| 6,371,852 B1 | 4/2002 | Acres |
| 6,375,567 B1 | 4/2002 | Acres |
| 6,390,921 B1 | 5/2002 | Busch et al. |
| 6,394,902 B1 | 5/2002 | Glavich et al. |
| 6,402,614 B1 | 6/2002 | Schneier et al. |
| 6,439,995 B1 | 8/2002 | Hughs-Baird |
| 6,471,208 B2 | 10/2002 | Yoseloff et al. |
| 6,488,280 B1 | 12/2002 | Katz et al. |
| 6,514,144 B2 | 2/2003 | Riendeau et al. |
| 6,523,829 B1 | 2/2003 | Walker et al. |
| 6,527,175 B1 | 3/2003 | Dietz et al. |
| 6,540,230 B1 | 4/2003 | Walker et al. |
| 6,565,084 B1 | 5/2003 | Katz et al. |
| 6,572,106 B2 | 6/2003 | Alexoff et al. |
| 6,572,107 B1 | 6/2003 | Walker et al. |
| 6,575,832 B1 | 6/2003 | Manfredi et al. |
| 6,582,307 B2 | 6/2003 | Webb |
| 6,582,310 B1 | 6/2003 | Walker et al. |
| 6,588,747 B1 | 7/2003 | Seelig |
| 6,595,854 B2 | 7/2003 | Hughs-Baird |
| 6,599,187 B2 | 7/2003 | Gerow |
| 6,599,192 B1 | 7/2003 | Baerlocher et al. |
| 6,607,439 B2 | 8/2003 | Schneier et al. |
| 6,612,501 B1 | 9/2003 | Woll et al. |
| 6,612,574 B1 | 9/2003 | Cole et al. |
| 6,619,660 B2 | 9/2003 | Schaefer et al. |
| 6,620,046 B2 | 9/2003 | Rowe |
| 6,625,578 B2 | 9/2003 | Spaur et al. |
| 6,645,074 B2 | 11/2003 | Thomas et al. |
| 6,645,075 B1 | 11/2003 | Gatto |
| 6,656,042 B2 | 12/2003 | Reiss et al. |
| 6,663,105 B1 * | 12/2003 | Sullivan et al. ............ 273/138.2 |
| 6,676,126 B1 | 1/2004 | Walker et al. |
| 6,679,497 B2 | 1/2004 | Walker et al. |
| 6,681,995 B2 | 1/2004 | Sukeda et al. |
| 6,682,419 B2 | 1/2004 | Webb et al. |
| D486,869 S | 2/2004 | Webb et al. |
| 6,685,561 B2 | 2/2004 | Anderson et al. |
| 6,692,353 B2 | 2/2004 | Walker et al. |
| 6,705,944 B2 | 3/2004 | Luciano |
| 6,716,103 B1 | 4/2004 | Eck et al. |
| 6,719,631 B1 | 4/2004 | Tulley et al. |
| 6,729,956 B2 | 5/2004 | Wolf et al. |
| 6,733,385 B1 | 5/2004 | Enzminger et al. |
| 6,736,324 B2 | 5/2004 | Behm |
| 6,749,198 B2 | 6/2004 | Katz et al. |
| 6,761,633 B2 | 7/2004 | Riendeau et al. |
| 6,786,824 B2 | 9/2004 | Cannon |
| 6,811,484 B2 | 11/2004 | Katz et al. |
| 6,824,467 B2 | 11/2004 | Schlottmann et al. |
| 6,843,724 B2 | 1/2005 | Walker et al. |
| 6,852,031 B1 | 2/2005 | Rowe et al. |
| 6,855,052 B2 | 2/2005 | Weiss et al. |
| 6,896,619 B2 | 5/2005 | Baltz |
| 6,899,622 B2 | 5/2005 | Lind et al. |
| 6,910,968 B2 | 6/2005 | Nassef et al. |
| 6,913,534 B2 | 7/2005 | DeFrees-Parrott |
| 6,918,589 B2 | 7/2005 | Thibault |
| 6,929,544 B2 | 8/2005 | Osterer |
| 6,934,846 B2 | 8/2005 | Szrek |
| 6,942,570 B2 | 9/2005 | Schneier et al. |
| 6,969,319 B2 | 11/2005 | Rowe et al. |
| 7,008,317 B2 | 3/2006 | Cote et al. |
| 7,008,318 B2 | 3/2006 | Schneier et al. |
| 7,024,375 B2 | 4/2006 | Chau |
| 7,052,394 B2 | 5/2006 | Walker |
| 7,073,720 B2 | 7/2006 | Behm |

(56) References Cited

U.S. PATENT DOCUMENTS

| | | |
|---|---|---|
| 7,094,149 B2 | 8/2006 | Walker |
| 7,112,135 B2 | 9/2006 | Anderson |
| 7,118,478 B2 | 10/2006 | Fayter et al. |
| 7,163,459 B2 | 1/2007 | Tanskanen et al. |
| 7,172,506 B2 | 2/2007 | Baerlocher et al. |
| 7,179,168 B1 | 2/2007 | Tulley et al. |
| 7,186,180 B2 | 3/2007 | Lathrop |
| 7,213,811 B2 | 5/2007 | Bozeman |
| 7,241,219 B2 | 7/2007 | Walker |
| 7,275,990 B2 | 10/2007 | Walker et al. |
| 7,285,045 B2 | 10/2007 | Schneier et al. |
| 7,285,048 B2 | 10/2007 | Karmarkar |
| 7,294,058 B1 | 11/2007 | Slomiany et al. |
| 7,303,468 B2 | 12/2007 | Schneier et al. |
| 7,303,470 B2 | 12/2007 | George et al. |
| 7,311,599 B2 | 12/2007 | Knapp |
| 7,357,393 B2 | 4/2008 | Finocchio |
| 7,416,484 B1 | 8/2008 | Nelson |
| 7,467,999 B2 | 12/2008 | Walker |
| 2001/0034635 A1 | 10/2001 | Winters |
| 2001/0046891 A1 | 11/2001 | Acres |
| 2001/0049305 A1 | 12/2001 | Riendeau et al. |
| 2002/0010015 A1 | 1/2002 | Acres |
| 2002/0013167 A1 | 1/2002 | Spaur et al. |
| 2002/0022509 A1* | 2/2002 | Nicastro et al. ................. 463/15 |
| 2002/0039923 A1 | 4/2002 | Cannon et al. |
| 2002/0042300 A2 | 4/2002 | Acres et al. |
| 2002/0052229 A1 | 5/2002 | Halliburton et al. |
| 2002/0061778 A1 | 5/2002 | Acres |
| 2002/0077173 A1 | 6/2002 | Luciano et al. |
| 2002/0090986 A1 | 7/2002 | Cote et al. |
| 2002/0090987 A1 | 7/2002 | Walker et al. |
| 2002/0093190 A1 | 7/2002 | Katz |
| 2002/0098882 A1 | 7/2002 | Lind et al. |
| 2002/0107072 A1 | 8/2002 | Giobbi et al. |
| 2002/0147040 A1 | 10/2002 | Walker et al. |
| 2002/0152120 A1 | 10/2002 | Howington et al. |
| 2002/0155885 A1 | 10/2002 | Shvili |
| 2002/0169018 A1 | 11/2002 | Schneier et al. |
| 2002/0187827 A1 | 12/2002 | Blankstein |
| 2002/0193158 A1 | 12/2002 | Weiss et al. |
| 2002/0198038 A1 | 12/2002 | Adams |
| 2003/0013531 A1 | 1/2003 | Rowe et al. |
| 2003/0027628 A1 | 2/2003 | Luciano |
| 2003/0032473 A1 | 2/2003 | Rowe et al. |
| 2003/0032476 A1 | 2/2003 | Walker et al. |
| 2003/0045340 A1 | 3/2003 | Roberts |
| 2003/0047869 A1 | 3/2003 | Walker et al. |
| 2003/0060257 A1 | 3/2003 | Katz et al. |
| 2003/0060261 A1 | 3/2003 | Katz et al. |
| 2003/0069068 A1 | 4/2003 | Kaminkow |
| 2003/0080508 A1 | 5/2003 | Thibault |
| 2003/0102625 A1 | 6/2003 | Katz et al. |
| 2003/0114217 A1 | 6/2003 | Walker et al. |
| 2003/0119581 A1 | 6/2003 | Cannon et al. |
| 2003/0139214 A1 | 7/2003 | Wolf et al. |
| 2003/0155715 A1 | 8/2003 | Walker et al. |
| 2003/0157977 A1 | 8/2003 | Thomas et al. |
| 2003/0171986 A1 | 9/2003 | Itkis |
| 2003/0176210 A1 | 9/2003 | Vancura et al. |
| 2003/0176212 A1 | 9/2003 | Schlottmann et al. |
| 2003/0184012 A1 | 10/2003 | Green |
| 2003/0186739 A1 | 10/2003 | Paulsen et al. |
| 2003/0195841 A1 | 10/2003 | Ginsberg et al. |
| 2003/0199318 A1 | 10/2003 | Nassef et al. |
| 2003/0218303 A1 | 11/2003 | Walker et al. |
| 2003/0220138 A1 | 11/2003 | Walker et al. |
| 2004/0025190 A1 | 2/2004 | McCalla et al. |
| 2004/0036212 A1 | 2/2004 | Walker et al. |
| 2004/0038723 A1 | 2/2004 | Schneier et al. |
| 2004/0051240 A1 | 3/2004 | Adams |
| 2004/0053683 A1 | 3/2004 | Hartl et al. |
| 2004/0059445 A1 | 3/2004 | Moore |
| 2004/0063484 A1 | 4/2004 | Dreaper et al. |
| 2004/0092307 A1 | 5/2004 | George et al. |
| 2004/0102238 A1 | 5/2004 | Taylor |
| 2004/0102239 A1 | 5/2004 | Samila |
| 2004/0127279 A1 | 7/2004 | Gatto et al. |
| 2004/0133472 A1 | 7/2004 | Leason et al. |
| 2004/0142741 A1 | 7/2004 | Walker et al. |
| 2004/0147308 A1 | 7/2004 | Walker et al. |
| 2004/0152504 A1 | 8/2004 | Herrmann et al. |
| 2004/0152510 A1 | 8/2004 | Herrmann |
| 2004/0180722 A1 | 9/2004 | Giobbi et al. |
| 2004/0185930 A1 | 9/2004 | Thomas et al. |
| 2004/0204222 A1 | 10/2004 | Roberts |
| 2004/0214628 A1 | 10/2004 | Boyd et al. |
| 2004/0229671 A1 | 11/2004 | Stronach et al. |
| 2004/0259629 A1 | 12/2004 | Michaelson et al. |
| 2004/0259631 A1 | 12/2004 | Katz et al. |
| 2005/0037841 A1 | 2/2005 | de Waal |
| 2005/0049042 A1 | 3/2005 | Walker et al. |
| 2005/0075158 A1 | 4/2005 | Walker et al. |
| 2005/0090314 A1 | 4/2005 | Nassef, Jr. et al. |
| 2005/0092839 A1 | 5/2005 | Oram |
| 2005/0124407 A1 | 6/2005 | Rowe et al. |
| 2005/0164779 A1 | 7/2005 | Okuniewicz |
| 2005/0170881 A1 | 8/2005 | Muskin |
| 2005/0187005 A1 | 8/2005 | Rose et al. |
| 2005/0258596 A1 | 11/2005 | Such |
| 2005/0282619 A1 | 12/2005 | Vancura et al. |
| 2005/0282626 A1 | 12/2005 | Manfredi et al. |
| 2005/0288088 A1 | 12/2005 | Englman et al. |
| 2006/0025219 A1 | 2/2006 | Nassef, Jr. et al. |
| 2006/0035696 A1 | 2/2006 | Walker et al. |
| 2006/0036450 A1 | 2/2006 | Nassef, Jr. et al. |
| 2006/0041586 A1 | 2/2006 | Nassef, Jr. et al. |
| 2006/0068893 A1 | 3/2006 | Jaffe et al. |
| 2006/0073884 A1 | 4/2006 | Walker et al. |
| 2006/0089194 A1 | 4/2006 | Joshi et al. |
| 2006/0148562 A1 | 7/2006 | Walker et al. |
| 2006/0194631 A1 | 8/2006 | Rowe et al. |
| 2006/0205511 A1 | 9/2006 | Thomas et al. |
| 2006/0247035 A1 | 11/2006 | Rowe et al. |
| 2007/0054729 A1 | 3/2007 | Hornik et al. |
| 2007/0060261 A1 | 3/2007 | Gomez et al. |
| 2007/0060274 A1 | 3/2007 | Rowe et al. |
| 2007/0060317 A1 | 3/2007 | Martin et al. |
| 2007/0060329 A1 | 3/2007 | Martin et al. |
| 2007/0060330 A1 | 3/2007 | Martin et al. |
| 2007/0060331 A1 | 3/2007 | Martin et al. |
| 2007/0060369 A1 | 3/2007 | Martin et al. |
| 2007/0087834 A1 | 4/2007 | Moser et al. |
| 2007/0167216 A1 | 7/2007 | Walker et al. |
| 2007/0173322 A1 | 7/2007 | Swamy et al. |
| 2007/0265062 A1 | 11/2007 | Thomas et al. |
| 2008/0032763 A1 | 2/2008 | Giobbi et al. |
| 2008/0039171 A1 | 2/2008 | Slomiany et al. |
| 2008/0039173 A1 | 2/2008 | Walther et al. |
| 2008/0287176 A1 | 11/2008 | Bennett |

FOREIGN PATENT DOCUMENTS

| | | |
|---|---|---|
| EP | 1762990 A2 | 3/2007 |
| EP | 1833014 A1 | 9/2007 |
| WO | WO 91/06931 | 5/1991 |
| WO | WO 97/37737 | 10/1997 |
| WO | WO 99/10057 | 3/1999 |
| WO | WO 99/16519 | 4/1999 |
| WO | WO 00/43087 | 7/2000 |
| WO | WO 00/69535 | 11/2000 |
| WO | WO 01/14029 | 3/2001 |
| WO | WO 03/004118 | 1/2003 |
| WO | WO 03/061795 | 7/2003 |
| WO | WO 03/084625 | 10/2003 |
| WO | WO 03/089077 | 10/2003 |
| WO | WO 03/089082 | 10/2003 |
| WO | WO 2004/013820 | 2/2004 |
| WO | 2004/105902 | 9/2004 |
| WO | WO 2004/114073 | 12/2004 |
| WO | WO 2005/029279 | 3/2005 |
| WO | WO 2005/031666 | 4/2005 |
| WO | WO 2005/079242 | 9/2005 |
| WO | WO 2006/028820 | 3/2006 |

(56) References Cited

FOREIGN PATENT DOCUMENTS

| WO | WO 2006/052469 | 5/2006 |
|----|----------------|--------|
| WO | WO 2007/035618 | 3/2007 |
| WO | WO 2007/040707 | 4/2007 |
| WO | WO 2007/076321 | 7/2007 |
| WO | WO 2007/145999 | 12/2007 |
| WO | WO 2008/014334 | 1/2008 |
| WO | WO 2008/022083 | 2/2008 |
| WO | WO 2008/022084 | 2/2008 |

OTHER PUBLICATIONS

H.X. Mel and Doris Baker, Cryptography Decrypted, 2001 Addison Wesly, chapters 9 to 12.

Virginia Lottery games, downloaded from www.archive.org, Apr. 29, 2007.

Pop Cap Games, Bejeweled, Feb. 3, 2005, http://web.archive.org/web/20050203202244/http://www.go2share.net/game/bejeweled/index.htm.

John Scarne, Scarne's Complete Guide to Gambling, 1961, Simon & Schuster, New York, chapter 4 on lotteries, pp. 125-126.

Wikipedia, "Wheel of Fortune (US Game Show)" Wikipedia, Nov. 13, 2007 <http://en.wikipedia.org/wiki/Wheel_of_Fortune_%28US_game_show%29>.

New Jersey, State of, "Wheel of Fortune" New Jersey Lottery, Nov. 13, 2007 <http://www.state.nj.us/lottery/instant/ig409.htm>.

New Jersey, State of, "Lots O' Spots Bingo" New Jersey Lottery, Dec. 6, 2007 <http://www.state.nj.us/lottery/instant/ig340.htm>.

http://www.powerball.com/powerball/pb_howtoplay.asp, accessed Sep. 14, 2008, All.

Written opinion of the international searching authority (international application No. PCT/US07/76224).

Examiner's first report on patent application No. 2003298941.

Bejeweled Deluxe, Version 1.87, Developed and published by PopCap Games, Inc., www.popcap.com, http://www.popcap.com/faq/bejeweled/1033/pc/readme.html (1of 8) Feb. 25, 2010 9:14:22 AM.

David, Matthew, Online Games Development in Flash—A Brief History, Apr. 28, 2003, SitePoint, http://articles.sitepoint.com/print/flash-brief-history (1 of 6) Jun. 18, 2010 8:28:50 AM.

* cited by examiner

METHOD AND APPARATUS FOR CONDUCTING A FIRST AND SECOND LEVEL GAME AND A GAME OF CHANCE

RELATED APPLICATIONS

This application claims priority under 35 U.S.C. §119(e) to U.S. Provisional Application Ser. No. 60/569,030, entitled "METHOD AND APPARATUS FOR CONDUCTING A GAME OF CHANCE," filed on May 7, 2004, which is herein incorporated by reference in its entirety.

FIELD OF THE INVENTION

The field of the invention relates generally to lotteries and gaming, and more particularly, to systems for conducting lottery-based games or casino-based gaming.

BACKGROUND

There are many different types of games that are provided that involve the issuance of a lottery ticket to play a game of chance. Lottery tickets are sold through retailers using machines referred to as point of sale (POS) terminals. These tickets are generally printed at the POS terminal, and are usually issued for some lottery drawing to be performed at a later time. Examples of these types of lottery games of chance include traditional state lottery drawings and multi-state lottery drawings (e.g., PowerBall). Another type of lottery ticket, referred to in the art as instant lottery, includes a pre-printed scratch-type lottery ticket which includes a latex or similar coating that is scratched off by a purchaser (a player), revealing one or more game indicia and whether the player won the game or series of games as indicated on the ticket. The indication is generally "instant" in that the player knows, when they scratch off the ticket coating, whether or not they won the game.

There are many online games that can be played using a computer system coupled to a communication network (e.g., the Internet). These games may include traditional games of chance, games of skill, and casino-type games, among others.

Some systems combine lottery-type games and online games. In one such system, a lottery ticket is sold to a player, who then plays a further game using a computer system. In such a game system, the ticket sold to a player includes a code which is correlated to a game seed stored in a computer system upon which a computer game is played. The computer game determines the correlated game seed, and this game seed is mapped to a series of predetermined game states that lead to a predetermined outcome. That is, the code stored on the ticket includes the outcome. In another type of system, the code stored on the ticket is an encoded form of the lottery result, which is then revealed to the player at the end of play of an online game.

SUMMARY

New and more interesting game formats are needed for lottery and casino type games that keep players' interest and therefore result in continued and/or return players. According to one embodiment of the present invention, it is appreciated there is a great deal of effort and expense to introduce additional games, especially in the casino area. In particular, as each game is introduced, its features are scrutinized by regulators prior to introduction. It therefore would be beneficial to be able to reduce the regulatory effort in introducing new games that are exciting to players to play. To this end, according to one aspect of the present invention, a system is provided having two games, one of which is already approved by regulators whose outcomes are used to drive outcomes of another game. Because the outcome determination and odds of winning the other game are driven by a previously-approved game, the regulatory hurdles associated with releasing the other game are reduced.

In one aspect of the present invention, the player is permitted to play a computer-based game (referred to hereinafter as a "primary" game) during which the game playing system reveals results of another game (referred to hereinafter as a "secondary" game). This secondary game may be a casino or lottery-based game and, according to one embodiment, this secondary game is already approved by regulators. One such game is the well-known game of Keno. However, it should be appreciated that the secondary game may be any other type of game (e.g., a lottery game). The primary game may be any type of computer-based game, including games of skill and/or chance, such as card games, casino games, video games or any other type of game through which a result from another game may be revealed. In one aspect of the present invention, the play of the primary game that the player plays does not affect the outcome of the secondary game. In another aspect of the present invention, the secondary game result does not affect the outcome of the primary game played by the player.

In one example, the primary game involves some level of influence by the player on the outcome of the primary game. For instance, the primary game may be a game of skill. However, it should be appreciated that the primary game be a game based on chance, or combination of skill and chance. In one example, the primary game may be similar to the well-known game of PAC-MAN (PAC-MAN is a trademark of Namco, Ltd., Tokyo, Japan) and its variations.

As is known, PAC-MAN is a game of skill that allows the player to collect points by "eating" objects arranged in a maze-type game. The PAC-MAN, Ms. PAC-MAN, and similar games involve one or more mazes, each of those mazes having dots and other objects that are collected for points, trying to accumulate as many points as possible. In the well-known game of PAC-MAN, the player is provided a finite number of "lives" and the player plays the game until his/her lives run out. There are many variations of the PAC-MAN-type game format. According to one embodiment of the present invention, the player may be permitted to play the game of PAC-MAN (or similar type game), during which the result of the primary game is revealed over one or more instances of the PAC-MAN-type game.

According to one aspect of the present invention, the PAC-MAN-type game is combined with a second level game. Play of the second level game may proceed after some achievement level in the PAC-MAN-type game. For instance, the player may play the PAC-MAN-type game as discussed above, and in one embodiment, the second level may proceed after the player successfully completes the PAC-MAN-type game. Alternatively, the player may play the PAC-MAN-type game until completion, and at an ending of the PAC-MAN-type game (e.g., the player quits the PAC-MAN-type game, etc.), the player begins playing the second level game.

According to one aspect of the present invention, the result of the primary game is stored on a server coupled to a computer system upon which the game is played. In one example, the result is downloaded to the computer system prior to game play. The result may be in the form of intermediate results of each game instance that are displayed to the player at various points during game play. For instance, intermediate results may be displayed to a user during an instance of a PAC-MAN-type game. For example, intermediate results may be shown to a player when a particular object is collected (e.g., eaten), a particular point total is attained or other achievement during the play of a PAC-MAN-type game.

In one embodiment of the present invention, the traditional game of PAC-MAN or similar game is coupled with a second level game. Further, during the play of the PAC-MAN-type game, one or more items are awarded to the player for use in the second level game. For instance, items are awarded when particular objects in the PAC-MAN-type game are collected. In the example of the PAC-MAN-type game, there may be an indication that one or more of the objects represented in the game contains an item (e.g., one that may be used with a second level game). This indication may be, for example, a graphical, textual, or other symbolic indication that the element contains an item. In one example, this indication may be the same or similar element used to indicate that there is an item associated with the element. The type of item may not, according to one embodiment, be known by the user until the item is revealed during game play. In one example, when the object having an associated item is eaten by a representation of the PAC-MAN (or other character) the game program displays the item to the player. The item may be, for example, an item that is used to reveal prizes in a second-level game. Alternatively, the player may be awarded a prize (or not) with the revealing of each item.

In another example, the first level game may contain more than one item, and these items may be collected by the player as items are revealed. When the game has ended, the player may use the one or more collected items in the second level game. In one example game, the items revealed during the game of PAC-MAN are used to open hidden items in a second level game. For instance, the second level game includes a series of boxes (or other element type) which are opened (and their hidden items revealed) with items collected during the play of the PAC-MAN-type game. In one example, the items are representations of keys used to unlock a box. However, it should be appreciated that the items may be any type of item that can be used in a second level game. In another example, the player may be presented a finite number of chances to open prize boxes that may reveal one or more prizes.

In yet another example, the player collects representations of keys, and in a second level game, the player operates a PAC-MAN type representation to open icons (or other element type), one or more of which may be associated with a prize. In one example, the player is permitted to open the same number of icons as items collected during play of the first level PAC-MAN game. In another example, the player is permitted to open one or more "free" icons in the second level game, in addition to icons that may be opened with collected items. In this example, a player will be permitted to play the second level game without having to collect an item in the first level game.

In another example, the player is permitted to play a PAC-MAN type game in the first level game, and keys collected in the first level game are used as indices into entries of a pay table in the second level game. The player is permitted to select among a plurality of prize boxes or other representation type in a second level game, each of the prize boxes or other representation, when selected, displays a hidden indication (e.g., an indication of a prize, an indication of a loss, etc.) to the player. If the player selects a prize box or other representation used as an index into the pay table, the player is awarded the corresponding prize indicated by the pay table. If not, the player does not win a prize.

According to one aspect of the present invention, the prizes awarded to the player in the second level game are predetermined. That is, the win/loss indication displayed (and therefore, the prize won by the player) is independent of the act of selecting a prize box or other representation by the player. Thus, the game provides an appearance to the player that the player has some influence on the outcome of the game, when in actuality, the outcome is not influenced by the actions of the player. This appearance increases the attractiveness of the game, and increases or maintains play by the player.

Prizes awarded during the second level of play may be, for example, a cash prize awarded for a particular game. It should be appreciated, however, that other prizes may be awarded (e.g., merchandise, credit, free play, etc.) and that the invention is not limited to any particular prize type.

According to one aspect of the present invention, prizes revealed during the second level game may be stored in a database of the server and downloaded to the client prior to play. In this example, the player may be allowed, when a ticket is purchased at a POS, the ability to play a number of instances of the game. Prizes may be awarded, for example, at each instance of the second level of the online game. To this end, the result of each prize may be stored in the database of the server, and may be indexed by an identifier of the ticket. For example, the identifier may be a serial number or other ticket-identifying information.

According to one aspect of the present invention, prizes are only awarded in the second level game. In another example, after a prize is revealed (or not) in the second level game, the player is permitted to play any remaining instances of the primary game (e.g., a slot-machine type game, PAC-MAN-type game, or any other type of game). According to another embodiment, the player may not be permitted to replay game instances after they have been played. To this end, a game-playing system may maintain a status of the game instances played by the player. The game-playing system may maintain other information, such as game play information, how prizes are revealed to the player, and other information that may be useful for assessing or auditing game play and playing experiences of the player.

Each instance of the game may include an associated prize (or not), and these prizes may be combined for an overall prize associated with the ticket. In one example, the prize associated with the first instance of the PAC-MAN-type game and its second level is $10.

Each instance of the game may include an associated prize (or not), and these prizes may be combined for an overall prize associated with the ticket. In one example, the prize associated with the first instance of the PAC-MAN-type game and its second level is $10. A prize associated with a second instance of the PAC-MAN-type game and its second level is $15. The prizes associated with each instance of the PAC-MAN-type game and its second level may be stored as an entry in the database of the server.

In an alternative embodiment, there is one instance of the PAC-MAN-type game, wherein there are multiple win opportunities within the single instance. For example, in a single game, there may be win opportunities associated with certain collected objects. When an object associated with one of the win opportunities is collected, a prize may be (or not) revealed to the player. A combination of these revealed prizes may total to a total prize associated with a particular ticket.

As an alternative to each result of each game instance being predetermined, the result of each prize for each instance of the game may be determined dynamically by the client computer. For example, if the overall prize (e.g., $25) for the ticket is known, the client can determine (e.g., randomly) a distribution of winnings of the overall prize among game instances. In the example above, a play of the ticket on one computer could award a $25 prize among two game instances as follows: $5 prize for the first game instance and $20 for the second game instance. Another play of the ticket on the same or different computer may award a $25 prize differently among the two game instances (e.g., $10 for the first game instance, $15 for the second game instance, etc.). It should be appreciated, however, that the game may include any number of game instances, and the prize associated with each game instance may be stored in any storage location (e.g., at the client computer, at the server, etc.).

In another example system, prizes may be awarded in association with each item collected in the game (e.g., a collected item in a PAC-MAN-type game). Therefore, prizes may be distributed among hidden items in the game grid as well as being distributed among game instances. As discussed, prize distribution may be stored in a database of the server, may be determined by the client (e.g., randomly), or may be stored at any location or be determined by any manner by the client.

According to another aspect of the present invention, an improved game experience is provided for revealing the result of an online game. As discussed above, a player purchases a ticket or other game piece at a POS or other location. On the ticket, multiple plays of an associated online game are provided with each ticket or other game piece. The player can play those multiple plays across a set of games. For instance, the set of games may include, for example, games of skill and/or chance as discussed above. Certain games may include one or more attempts (or opportunities) for winning prizes. These opportunities for winning may be associated with one or more prizes. For example, a player playing a slot machine may be awarded a certain number of opportunities to play a game (e.g., a game instance (or game play) or other opportunity to win a prize when playing a particular game instance). In the case of a slot machine game, the player may be given a particular number of spins of the slot machine game, and, as a result of each spin, the player may be awarded (or not) a prize. In one embodiment, the result of the overall game is predetermined, and a game experience is determined for each opportunity (e.g., spin) that results in a contribution to the result of the overall game.

According to one embodiment of the present invention, the type of game that is played is immaterial to the outcome revealed to the player. More particularly, the same outcomes associated with a particular ticket may be used to drive multiple types of games. This allows, for example, the gaming operator to offer multiple types of games with a single ticket, and allows the player to select which game(s) to play to reveal the outcomes associated with the particular ticket. For instance, the player may elect to play a slot machine game for a first game instance of a ticket, and for a second instance, play a PAC-MAN-type game. Of course, it should be appreciated that any type of game and other combinations of games are possible. In this manner, the player may be provided the flexibility to play particular games in which the player is interested, thereby increasing his/her interest and participation in the game. Further, the game operator is provided additional flexibility as new games may be introduced/substituted that are associated with the same ticket or other game piece.

According to one embodiment of the present invention, the outcome of the game is predetermined at the time of ticket printing, issuance, or purchase or shortly thereafter. That is, the game outcome associated with a particular ticket is available prior to, at the same time, or shortly thereafter the ticket is provided to the player, after which time the player is permitted to play any games to reveal the predetermined outcome. In another embodiment, outcomes associated with tickets issued to the player are determined some time after the ticket issuance (i.e., outcomes are "post-determined"). Such is the case with Keno or other drawing-based games wherein game outcomes are determined after ticket issuance. In such a game, players are permitted to obtain the outcome at a predetermined time, usually after the player has purchased the ticket. In one aspect of the invention, it may be beneficial to have a later activation of tickets, especially in the case of a ticket-based game where tickets are issued in some other gaming environment (e.g., a casino). It may be desirable to only permit the player to play such a game outside the gaming environment so as not to compete with other games. Additionally, it may be desirable to require the player to revisit the gaming environment to redeem the ticket and increase the chances that the player will purchase additional tickets or play other types of games offered in the gaming environment.

Also, according to another aspect of the present invention, a first game may be used to reveal the result of a second game. As discussed above, this second game may be one which is already approved by regulators. Such a system may be, for example, a game whose results are driven by a random number generator (or RNG as referred to in the art). One such game is the well-known game of Keno. Another game that may be used is the well-known game of bingo. Other games may be used to drive the result of an online game.

In one example, a Keno game and its associated system are used to generate reveal results which are revealed to a player during play of an online game. To this end, a Keno-based system may be used in conjunction with an online gaming system to present new and interesting online games whose outcomes are driven by results provided by the Keno system. In one particular example, a Keno system provides a correlation of a ticket identifier to a Keno game which is held at some predetermined time. As the Keno numbers are drawn, an outcome is produced associated with the particular ticket identifier and provided to an online gaming system. The online gaming system uses the produced outcome to render a new and interesting gaming experience within an online gaming environment. As discussed, such an environment may include online play of one or more online games of skill, chance, or combination thereof.

According to one embodiment of the present invention, wins are optimized across game instances associated with a ticket. For instance, a ticket may have a predetermined outcome (for example, awarding a prize of $50), that may be allocated across the game instances associated with that ticket. For example, in the case of winning $50 on a 5-play (5 game instances) ticket, it may be desired to allocate the wins across game instances to provide a particular game experience. For instance, the game experience of winning $50 may be distributed across five game instances (e.g., five separate games, respectively winning $5, $0, $0, $5, $40) to provide the player an early indication of winning. Also, the remaining game play of the game instances may be scripted to build the drama of the game experience while still retaining player interest. Such a scripted outcome is more interesting, according to one embodiment, as the player is presented an outcome in a way such that retains interest in the game. This is beneficial, as an overall result includes extending scratch-type games or other type of game experience beyond the point of sale, and beyond the instant (but fleeting) gratification associated with scratch-type or other instant ticket game experiences.

According to one embodiment, a player is permitted to wager and redeem bets at authorized locations (e.g., legal jurisdictions such as lottery retail establishments, casinos, and the like) while the online portion of the game may be played in any locale or jurisdiction. In such a case, the casino or lottery experience is extended to locations where otherwise lottery and/or casino games are not available. Thereafter, players return to the lottery or casino establishment to redeem their tickets thereby providing yet another opportunity to entertain the player.

According to yet another aspect of the present invention, winning results may be split across opportunities to win. One embodiment of the present invention relates generally to how wins are shown to the player across win opportunities. In one specific example, one embodiment relates to a method for revealing wins to a player across a play of multiple game instances that build excitement for the player and which holds the interest of the player in continuing to play the game. It is appreciated that the game experience may be made more compelling if wins are distributed among win opportunities in an interesting way.

Another method for maintaining the interest of players includes awarding additional opportunities to win with each ticket. For instance, one of the prizes awarded with a particular opportunity to win (e.g., during the play of the game instance) may be one or more additional opportunities to win. For instance, in a slot machine game, an issued ticket may be associated with five (5) spins. One of the prizes awarded with the ticket may include additional spins. At the time of initial ticket activation, it may be predetermined that the ticket is associated with these additional opportunities to win, and these additional opportunities may be associated with the issued ticket. The player, when playing the game, will obtain additional satisfaction in playing because the number of game instances to be played by the player are increased, and therefore, their opportunity to win is also increased. This may be beneficial to create a more realistic gaming experience (such as in casino slots) where additional spins may be awarded during casino play. However, unlike casino play wherein slot play can be continued from an online account or by placing additional bets to create a more continuous game experience, the additional spins are awarded to a single ticket.

In the case where an online game system is a Keno-based or other drawing-based systems wherein results are not predetermined, additional opportunities to win may be associated with the ticket in the form of additional numbers selected by a computer system and associated with the ticket at the time of a drawing. This may be performed, for example, by assigning one or more additional drawing entries as a prize itself in the pay table associated with the Keno or other drawing-based game. More particularly, the drawing entries may be awarded as prizes, which themselves are indexes into other entries in the same pay table. Such additional entries may correspond to one or more prizes. For example, when the drawing occurs, the additional plays are awarded to the drawing numbers associated with the ticket. These drawing numbers may be associated with a particular game instance, of which there may be many associated with one ticket. At the point when the ticket is activated by the result of the drawing and play of the online game is permitted, the player, upon the beginning of play of the ticket or a particular game instance, the player is awarded the additional plays (and therefore, any prizes) associated with these additional plays. The additional plays may be played as additional game instances, which themselves have additional reveal opportunities. Alternatively, additional reveal opportunities may be added to one or more other game instances to make game play more exciting.

In another example, additional opportunities to win are awarded to a ticket, but these additional opportunities are awarded for a future game instance. In one example, the game reveals, during a win opportunity (e.g., a spin, a reveal, etc.) in a first game instance, one or more win opportunities within a second game instance. These win opportunities may be redeemed and "added on" to the second game instance, or the win opportunities may be provided as part of a "free play" of an additional game instance. In the case of a game driven by a drawing-based system (e.g., Keno, bingo, etc.), additional win opportunities may be provided for game instances conducted at a later time. For example, in a first game, a player may be provided a "free play" of a game instance to be conducted (or available to be played) at a particular start time. To this end, the player may be provided an additional code that allows the player to play the game at the later time. In the case of a subscription-based system wherein a player subscribes to play more than one game, the player may have additional plays added to his/her existing subscription.

In another aspect of the present invention, winnings by a player may be redeemed online to allow the player to play further instances of the online game. For instance, the player, after receiving a prize when playing a particular game instance, is permitted to redeem the prize online. In one type of online redemption, the player is provided one or more additional game instances to be played. To this end, the player may be provided one or more access codes allowing the player to play the additional game instance(s). These additional access codes may be provided to the player in an interface of the game, by e-mail, or other method.

According to another aspect of the present invention, a method is presented for providing players an enhanced gaming experience. According to one embodiment, it is appreciated that it is beneficial to enhance players' interest in playing games, particularly losing ones. In one embodiment, an illusion is presented to players to provide the illusion of being very close to winning a particular game. For instance, in the case of a slot machine, the slot machine result may indicate, in a three-wheel slot machine, that the player received a winning combination of two of the first wheels, and only with the revealing of the last wheel does the player realize that he/she has lost the game. According to one aspect, it is realized that the losing game experience should compel the player to continue playing the game.

In another example system, prizes may be awarded in association with each item collected in the game (e.g., number of points in a slot machine type game). Therefore, prizes may be distributed among elements or levels during play as well as being distributed among game instances. As discussed, prize distribution may be stored in a database of the server, may be determined by the client (e.g., randomly), or may be stored at any location or be determined by any manner by the client.

According to another aspect of the invention, it is appreciated that conventional methods for playing online games of chance are not secure. In particular, because the result or outcome of the game or predetermined sequence of game states may be encoded on a ticket, the lottery game may be compromised if the winning codes are deciphered. Such a deciphering could occur, for example, by hacking a computer system associated with the online lottery and obtaining a list of winning tickets, or reverse engineering software (e.g., on a PC) where the winning codes or sequence of game states may be stored. Further, it is realized that in such conventional systems, the lottery ticket or the online game software and its data are single points of security failures in the system.

One aspect of the present invention relates to a method for conducting a game of chance. According to one embodiment, a more secure method is provided by which an online game may be played. Instead of placing a game seed that determines a sequence of game states on a ticket (e.g., an instant scratch or lottery ticket), the game states or outcomes may not be placed on the ticket. Rather, the outcomes may be stored in an online database. To this end, a code may be stored on the ticket, the code being used as a decryption key used to find the outcome stored in the database. In particular, there may be a mapping between an outcome code and a corresponding decryption key that is printed on the ticket.

Because the decryption key is placed on the ticket, unauthorized access to the online game is not permitted without the physical ticket. In another embodiment, a portion of the decryption key is placed on the ticket, and another portion is stored in a database associated with the online game. In this manner, security cannot be breached without having both portions of the key (either having the issued ticket portion or the online portion). Thus, a hacker may not compromise a lottery ticket database without the ticket, and, by virtue of having a winning ticket, other winning ticket numbers may not be determined. Access to the online portion of the key may be obtained, for example, by providing some other information (e.g., a serial number printed on the ticket). However, it should be appreciated that the information used to gain access to the online portion of the key need not be printed on the ticket—the information may be provided on some other medium or by another method.

The ticket may be, for example, a scratch-type lottery or "instant" ticket, pull-tab, or type of pre-printed ticket type. Alternatively, the ticket may be a printed lottery ticket as is known in the art, which is a ticket printed at a Point of Sale (POS), usually in the form of a lottery drawing ticket (e.g., PowerBall or other type lottery drawing game). Also, the ticket may be an electronic ticket issued by a computer system. It should be appreciated that the ticket may be any type of ticket issued in any form, and the invention is not limited to any particular ticket type method of issuing a ticket.

According to one aspect of the present invention, a method is provided for playing a game of chance. The method comprises acts of issuing a ticket to a player, the ticket including a code printed on a surface of the ticket, and providing for the player to play a maze game on a different medium than the issued ticket, wherein the code is used to gain security access to obtain results of the game of chance. According to one embodiment, the act of issuing a ticket includes issuing at least one of a lottery ticket, a scratch ticket, and a pull-tab ticket.

According to another embodiment, the act of providing further comprises an act of providing a computer-based game which the player plays to reveal the results of the game of chance. According to another embodiment, the act of providing a computer-based game further comprises an act of permitting access to the results of the game of chance by using the code as a decryption key to obtain the results. According to another embodiment, the method further comprises an act of storing, on a server, the results of the game of chance.

According to another embodiment, the method further comprises an act of storing, in a database of a computer system, a portion of a decryption key, the portion being used along with the code by the computer system to obtain the results. According to another embodiment, the act of providing includes an act of permitting access to a website to play the maze game. According to another embodiment, the method further comprises an act of obtaining, from the database of the computer system, the portion of the decryption key based on an identifier printed on the ticket. According to another embodiment, the identifier is a serial number associated with the ticket. According to another embodiment, the method further comprises an act of presenting, to the player, an interface in which the player is permitted to enter the code to obtain security access to the results.

According to another embodiment, the maze game is a PAC-MAN-type game. According to another embodiment, the maze game includes a second level game in which one or more prizes are revealed. According to another embodiment, the maze game is a computer-based game involving a collection of items positioned in a maze, and wherein the method further comprises an act of collecting, by the player, the items positioned in a maze shown within an interface of the computer-based game. According to another embodiment, the method further comprises an act of using, by the player, the items collected in a second level game in which one or more prizes are revealed.

According to another embodiment, the ticket discloses the number of game instances of the maze game awarded to the player. According to another embodiment, the prize total for the ticket is predetermined. According to another embodiment, the sequence of reveals is predetermined. According to another embodiment, wherein the reveals are randomly determined by the client. According to another embodiment, wherein the sequence of reveals is stored in a database of a server.

According to another embodiment, the method further comprises an act of revealing, to the player, an item associated with a second level game. According to another embodiment, the item is used by the player to reveal a prize won by the player. According to another embodiment, the item associated with the second level game is an item collected in the first level game, and wherein the method further comprises acts of permitting the player, in the second level game, to select among a plurality of objects, upon selecting, by the player, a particular one of the plurality of objects, performing acts of, if the particular one of the plurality of objects is associated with a prize, awarding the prize to the player, and displaying an indication of the awarded prize to the player.

According to another embodiment, the method further comprises an act of associating a set of items collected in the first level game with corresponding pay table entries in the second level game. According to another embodiment, the method further comprises an act of displaying, upon the selection of the particular one of the plurality of objects, a pay table entry associated with the collected item. According to another embodiment, the awarded prize is predetermined. According to another embodiment, the act of selecting the particular one of the plurality of objects is independent of an act of determining what prize is awarded by the act of awarding.

According to another embodiment, the prize won by the player is at least one of cash, merchandise, and credit. According to another embodiment, an indication of the prize won by the player is stored in a database of a server, and is downloaded to a computer presenting the computer-based game to the player.

According to another embodiment, the method further comprises an act of associating, with the ticket, additional opportunities to win. According to another embodiment, the additional opportunities to win include one or more additional reveals of results associated with the game of chance. According to another embodiment, the one or more additional reveals of results are presented during play of an online game.

According to another embodiment, the method further comprises an act of providing, by a first server associated with a first game, a result associated with the game of chance. According to another embodiment, the method further comprises an act of storing, in a memory of a computer system, the result associated with the game of chance. According to another embodiment, the method further comprises an act of associating the result with an indication of the ticket. According to another embodiment, the indication of the ticket is unique among indicators of a plurality of tickets.

According to another embodiment, the first server further comprises a random number generator, and the random number generator performs an act of determining a set numbers associated with the issued ticket. According to another embodiment, the method further comprises an act of determining a set of winning numbers associated with the game of chance. According to another embodiment, the method further comprises an act of determining the result of the game of chance based on a comparison of the set of numbers associated with the issued ticket and the set of winning numbers. According to another embodiment, the game of chance includes at least one of a Keno game and a bingo game, and the act of determining a set of numbers associated with the issued ticket comprises an act of selecting a predetermined number of numbers from a predetermined set of numbers.

According to another embodiment, the method further comprises an act of permitting the player to redeem the issued ticket without playing the game on the different medium. According to another embodiment, the sequence of reveals is determined by a predetermined game script. According to another embodiment, the sequence of reveals is determined dynamically by a game playing computer system.

According to another embodiment, the method further comprises an act of determining a predetermined game script where a magnitude of prizes awarded for reveals associated with later win opportunities are progressively greater than the magnitude of prizes associated with reveals associated with earlier win opportunities. According to another embodiment, the method further comprises an act of determining, for an issued ticket indicated as a losing ticket, a game script comprising an indication that the player was substantially close to winning.

According to another embodiment, the player must wait a predetermined time period before redeeming the ticket. According to another embodiment, the player must wait until a specific event has been completed before redeeming the ticket. According to another embodiment, the player is permitted to redeem the ticket online. According to another embodiment, the player is permitted to redeem the ticket to play one or more additional online games. According to another embodiment, the method further comprises an act of receiving an access code for playing the one or more additional online games. According to another embodiment, the access code is transmitted electronically to the player.

According to another embodiment, the player must wait until a specific event has been completed before gaining access to obtain results associated with the ticket. According to another embodiment, the issued ticket discloses a number of game instances awarded to the player.

According to another embodiment, the prize total for the ticket is determined after the ticket is issued to the player. According to another embodiment, the method further comprises an act of determining an outcome associated with the ticket based on a drawing. According to another embodiment, the method further comprises an act of permitting the player to play the another game in response to the act of determining the outcome. According to another embodiment, the prize total for the ticket is determined prior to issuing the ticket to the player.

According to another embodiment, the maze game is a multiplayer game. According to another embodiment, the maze game is played by at least one other player over the Internet. According to another embodiment, the method further comprises acts of downloading a list of high scores associated with play of the maze game and displaying the list to the player.

According to another embodiment, the method further comprises an act of downloading a game program, the game program, when executed, renders an interface of the maze game in an interface of a game-playing computer system. According to another embodiment, the game program does not require an installation of one or more components on the game-playing computer system. According to another embodiment, the game program executes within a browser program window in an interface of the game-playing computer system. According to another embodiment, wherein the game program is programmed using Macromedia Flash programming.

Further features and advantages of the present invention as well as the structure and operation of various embodiments of the present invention are described in detail below with reference to the accompanying drawings. In the drawings, like reference numerals indicate like or functionally similar elements. Additionally, the left-most one or two digits of a reference numeral identifies the drawing in which the reference numeral first appears.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 2:
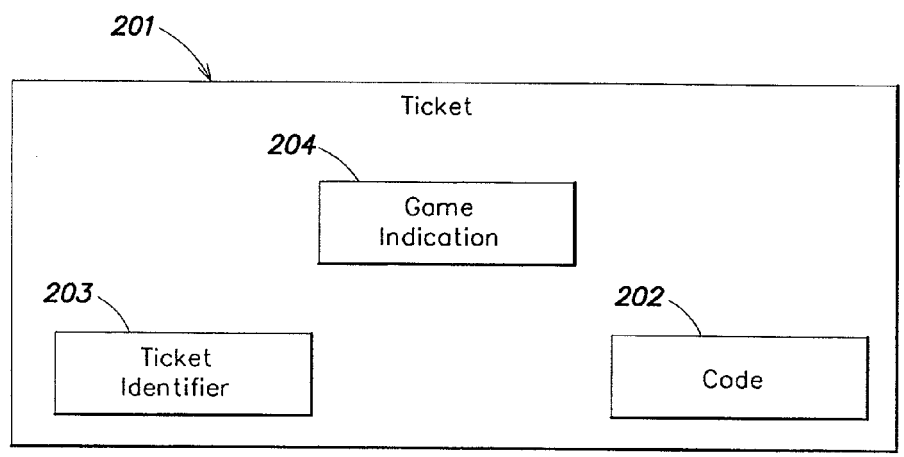
FIG. 2 is an example ticket that may be issued in association with a game according to one embodiment of the present invention.

FIG. 2 shows an example ticket 201 that may be issued to a player. The player may scratch a surface of the ticket (in the case of a scratch ticket) to reveal one or more indications. These indications may include, for example, a serial number of the ticket, an access code, or other indication (or combination thereof) that may be used to access the online game. Alternatively, the ticket may be a pull-tab ticket or other ticket type suitable for presenting indications to a player.

The ticket may include other indications (e.g., a decryption key or portion thereof as described above that may be used to decrypt game results). Also, the ticket may indicate to a player the number of plays of a second game (e.g., as played by the player on a computer system). For instance, in the case of a slot machine game, the ticket may indicate the number of spins that a player may be awarded by the ticket. In the case of a PAC-MAN-type game, the ticket may indicate the number of game instances (or plays) of the PAC-MAN-type game that can be played by the player. Further, as discussed above, the player may be permitted to play any one of a number of offered games, and the player may select different games to play to reveal results associated with game instances. The ticket may be associated with one or more games, and there may be an indications on the ticket to which games (e.g., a PAC-MAN branded game) the ticket provides access. The ticket may be associated only with a single game (e.g., a single-branded game), or may be indicative of multiple games that can be played.

In one embodiment, ticket 201 includes a code 202 printed on a surface of the ticket that provides access to outcomes (e.g., prizes) stored on the server. As discussed, code 202 may also include, as an optional feature to increase security, a key that may be used to decrypt the outcome. This outcome may be stored in a database stored on a server system. Ticket 201 may also include a ticket identifier 203 used to identify the ticket, and which may be used to identify the outcome associated with the ticket. Further, ticket 201 may include a game indication 204 that relates information relevant to a game played on a computer system. For example, there may also be stored, on the ticket, an identifier that indicates, to the player, the number of plays associated with an online game. In one example, a player purchases a ticket at a retailer or other POS location.

Figure 1:
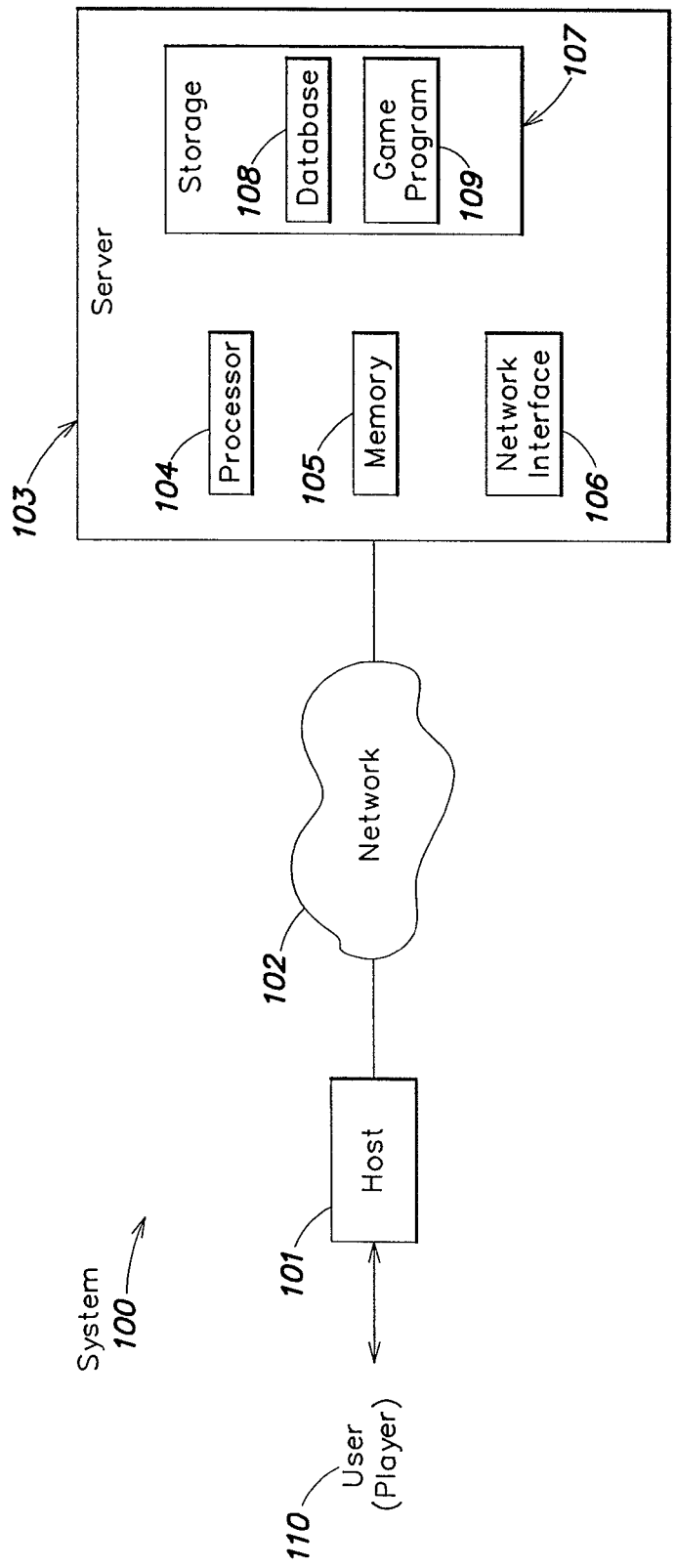
FIG. 1 is block diagram of a system for conducting a game according to one embodiment of the present invention.

The player then proceeds to play a game on a computer system. FIG. 1 shows an example system 100 according to one embodiment of the invention upon which a game may be played. The user (a player) 110 plays a game through an interface of a host computer system (e.g. host 101). Host 101 may be any type of computer system that is capable of playing a game. The host may be, for example, a general-purpose computer system (e.g., a personal computer (PC)) that connects to a network (e.g., the Internet). Other general purpose computer system types (e.g., a PDA, a cell phone, set-top box, or other system type) may be used to play the game.

The computer system may be coupled to a server system 103 through one or more communication networks 102. The server may provide a game program 109 that is executed by host 101 for playing the game. More particularly, game program 109, when executed, may provide an online game that can be played by a user through an interface associated with host 101. This online game may be, for example, a video slot machine, blackjack, or other online or casino-type game.

The game program may be stored, for example, in a computer-readable medium (e.g., a memory, storage, or other media) associated with server 103 that provides game programs. For instance, the game program may be stored on a web server and downloaded to a client computer over the Internet. Game program 109 may be one of a number of game programs associated with an online game experience. Different game programs may be selectively downloaded to the client, based on the type of game ticket issued, the game selected for play by the user, the type of client used, or other criteria.

Server 103 may also be a general-purpose computer system, or any other type of computer system capable of authenticating tickets, providing game programs, and performing other game-related functions. Further, it should be appreciated that various game functions may be performed by one or more server systems. Server 103 generally includes a processor 104 for executing server-based game functions. Server 103 may also include a memory 105 for storing data associated with game programs. Server 103 may also include one or more network interfaces 106 that couple server 103 to network 102, which permit server 103 to communicate with one or more hosts. Further, server 103 may include one or more storage entities 107, including disks or other media for storing data. In one embodiment, storage 107 is adapted to store one or more game programs 109 as discussed above. Server 103 may have any number or type of processor that executes an operating system and one or more application programs. In one embodiment, server 103 provides web server content to one or more clients for the purpose of accessing and playing the game.

Server 103 may also include a database 108 that is adapted to store one or more outcomes associated with a ticket or other gaming piece. As discussed, the outcome may be indexed using an identifier of the ticket.

Figure 3:
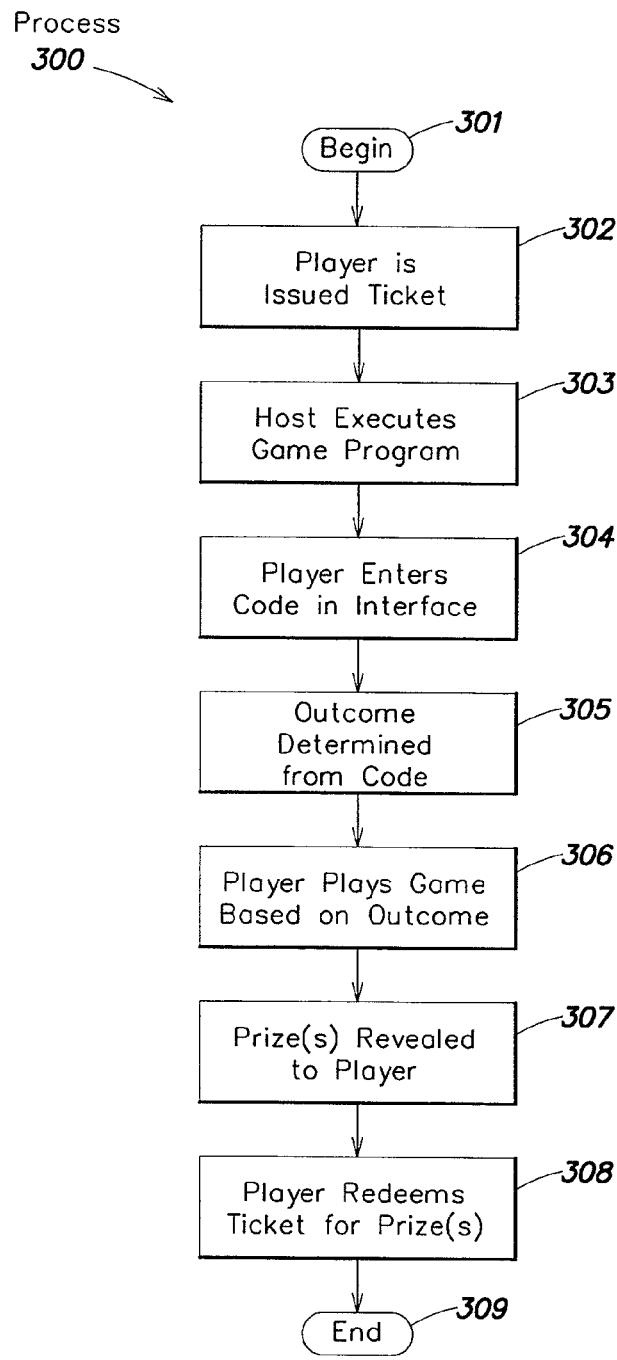
FIG. 3 is a flow chart of a process for conducting a game according to one embodiment of the present invention.

FIG. 3 shows one example process for conducting a game according to one embodiment of the present invention. At block 301, process 300 begins. At block 302, a player is issued a ticket. As discussed, a player may purchase a ticket at a retailer or other POS location. At some later time and/or location, the player may play an online game on one or more computer systems (e.g., a PC or other computer system capable of playing games). For instance, at block 303, a host computer system (e.g., host 101) executes a game program. The game program may be, for example, an online game that includes one or more components downloaded over a communication network (e.g., the Internet).

As discussed, the ticket may include a code which is used to access the outcome of a game. This code may be printed on a face of the ticket as discussed above with reference to FIG. 2. In one example system, the player accesses a website that includes an interface in which the player may enter the code at block 304.

This interface may be, for example, used to access the game, or may be any other interface (e.g., an interface used to access a download website used for downloading game software (e.g., game program 109)). The interface may be programmed in one or more computer languages (e.g., an HTML, Java, Macromedia Flash, or other type interface) and may include a text entry box in which the player can input the code. The interface may include other ways of entering a code or other parameter (e.g., a glyph printed on a ticket) that allows the user to gain access to the game. It should be appreciated that the invention is not limited to any particular method for entering the code, or any format of the code, and that any type of code or method of entry may be used.

The player enters the code, and an outcome is determined at block 305 based on the code. More particularly, there may be a mapping between the code printed on the ticket and an outcome stored on the server. This code may be stored, for example, in a database structure stored in database 108 of the server. Database 108 may be, for example, a relational database, object database, flat file database, or other organizational entities used to store and maintain data. Further a listing of winning codes may be furnished to an organization that provides the game (such as, for example, a state-run lottery commission). The code may, as discussed above, include an optional decryption key that decrypts an entry stored on the server. This entry may indicate one or more outcomes of game instances.

The outcome of the game is then used by the online game to determine play of the game by the player at block 306. For instance, if the stored outcome is "Win $50," the online game may present an outcome to the player that indicates that the player won a $50 prize. This presentation may be in the form of one or more reveals presented to the player while playing the online game at block 307. The presentation may be progressive, in that the ultimate outcome (e.g., "Win $50") is achieved through a set of reveals or progressions through the online game. For example, in the case where a PAC-MAN-type game is played wherein items are collected for playing in a second level game, such reveal outcomes of each instance of the PAC-MAN-type game may be stored on the server.

As discussed, prizes may be distributed over game instances and/or items (or more generally, win opportunities) to maximize game interest and to entice the player to play each game instance associated with a particular ticket. For example, one approach may include providing to the player an early (relative in the series of game instances) indication of winning to keep the player interested. As the player plays more game instances, the magnitude of the prizes may be adjusted such that a level of game "drama" is increased. That is, prize values are adjusted among later game instances to provide relatively higher prize values in later games. Other approaches/distributions may be provided for increasing or maintaining game interest.

Once played, the player may redeem the ticket at the point of sale or other redemption location at block 308. Alternatively, the player may be permitted to redeem the ticket without playing the game. Redemption may be permitted, for example, after a predetermined time. For instance, the player may be permitted to redeem a ticket after a set time (e.g., 10 PM), a particular time period after ticket purchase (e.g., 24 hours) or other absolute or relative time. This may be the case for a Keno or lottery-based system, where a Keno or lottery result is made available at a set time after ticket purchase. Alternatively, tickets may be redeemed immediately after purchase. At block 309, process 300 ends.

Payouts may be determined by a pay table associated with the game. The number of tickets may be determined a priori, and a pay table that determines payouts may be allocated to the tickets. This allocation may be determined, for example, by shuffling the pay table and allocating results to tickets. The following is an example of a pay table that may be used with a game according to one embodiment of the invention:

Number of Tickets Issued: 2000
Ticket Price: $5

TABLE I

Example Payout Table

| Number of Tickets | Payout |
|---|---|
| 1 | $100 |
| 700 | $10 |
| 500 | $5 |
| 100 | $1 |
| 600 | $0 |

Game Operator Return: $300(3%)–expenses

As shown in the example above, a certain number of tickets may be allocated as winning tickets having a particular payout (e.g., an outcome). Some tickets may have no payout associated with them, and some may only have a nominal payout (e.g., a small award amount, free ticket, etc.). A small number of tickets may include a large payout as compared to the magnitude of other payouts. It should be appreciated, however, that payouts are not limited to money, but other types of prizes may be awarded including merchandise, credit, loyalty points or any other representation of value.

The odds of winning may be the type of odds experienced in actual (rather than computer-based) games. Alternatively, the odds of winning may not necessarily be "natural" odds of winning any particular type of game, but rather, the odds may be adjusted to obtain the outcome desired (e.g., by the gaming operator). The odds of winning, number of winning tickets, amount of payout per ticket, or other payout parameter may be any amount or number, and the invention is not limited to any particular odds of winning, number of winning tickets, payout amount or type of payout. However, according to one embodiment, the overall odds of winning, amount and type of payout, etc. may be similar to a game previously approved by regulators (e.g., scratch ticket games, Keno, bingo, etc.) so that the use of an additional game to display an outcome associated with the previously-approved game is scrutinized much less by regulators, and as a result, the approval of the additional game is less burdensome. To this end, a system associated with the previously-approved game may provide ticket and outcome information to a system conducting an online game (e.g. server 103).

The code stored on the server (e.g., server 103) may be used to determine game play as played on the computer system. For instance, the game outcome may be "Win $50." In the case of a slot machine-type game, the ticket may indicate that the player receives 10 spins of the slot machine. The outcome of each spin may be predetermined, and the game may retrieve information from the server indicating a predetermined sequence of game play as discussed above. In the case of a slot machine-type game, the predetermined sequence may indicate the winnings associated with each of the spins. In the case of a PAC-MAN-type game, the outcome of each instance of the second level game may be stored on the server and retrieved prior to game play. In another example in the case of a single instance of a PAC-MAN-type game, intermediate reveal outcomes to be displayed to the player during the single instance of the PAC-MAN-type game may be stored on the server and retrieved when necessary. These outcomes may be revealed to the player at different points during play of the PAC-MAN-type game. For instance, outcomes may be revealed when items/objects are collected, certain point totals are achieved, etc.

In another example, only the overall outcome is predetermined (e.g., the total winning associated with the ticket), and the sequence of game play may be determined when the game is played. In the example above where the player is indicated as winning $50 over 10 spins, the $50 winnings (and any intermediate losses) may be allocated to the player at any point over the 10 spins. In the case of the PAC-MAN-type game, winnings may be allocated across game instances. In a further example, winnings may be allocated across items collected while playing the PAC-MAN-type game. Because the number of items collected may vary depending on the skill of the player, the distribution of prizes among collected items may be determined during game play by the game playing system. Thus, according to one embodiment, the player's skill (or lack thereof) does not affect the overall outcome of the game.

This allocation may be determined by the server, the game software executing on the client, or a combination thereof. Further, the game play may be randomized in that a further play using the same ticket may yield a different sequence of game states leading to the same outcome. For example, in the case of a slot machine game as described above, a player may be indicated as winning $50, but the sequence by which the player attains the $50 winning outcome may be different depending on various factors. Such factors may include a randomization function that determines results of individual game plays (e.g., in the case of a series of "spins," the result of each spin), or some other function. The series of intermediate outcomes may be stored in a database associated with the server as discussed above with respect to game outcomes. Also, the outcomes may be adjusted using a formula or rule-based approach during execution of the game to increase the game drama and heighten the game playing experience.

According to another aspect of the present invention, a player may purchase a ticket at a point of purchase (e.g., a convenience store) and the indication of a win/no win condition of the ticket is revealed on a different medium. For instance, a player purchases a scratch ticket in a convenience or other type of store. The prize that the player wins is not revealed on the scratch card itself, but rather the prize is revealed through another medium (e.g., on a home computer system, PDA, cell phone, etc.).

For instance, as discussed above, the player may be presented another game (e.g., a slot machine or PAC-MAN-type game as described above) that reveals at least a portion of the prize. The underlying prizes available via the reveals may be predetermined, in that the outcome of the game may be stored in one or more systems. The scratch ticket may reveal different numbers of plays (e.g., pulls in the case of a slot-machine type game, or game instances of a PAC-MAN-type game) the player receives.

In one aspect of the present invention, the ticket includes authentication information that is used to obtain the reveals. In one example, the scratch ticket contains a secret key which is used to decrypt the results that are revealed to the player. That is, according to one aspect, it is impossible to determine if and what a particular ticket wins without having possession of the ticket (and therefore the secret key). In another example, the scratch ticket could contain only a portion of the secret key. The other portion of the key may be stored, for example, on a server and retrieved from a database (e.g., file, relational database, etc.) based on, for example, the serial number of the card. Mappings of serial numbers of tickets to encrypted results can be provided to the lottery provider for additional audit control.

Figure 4:
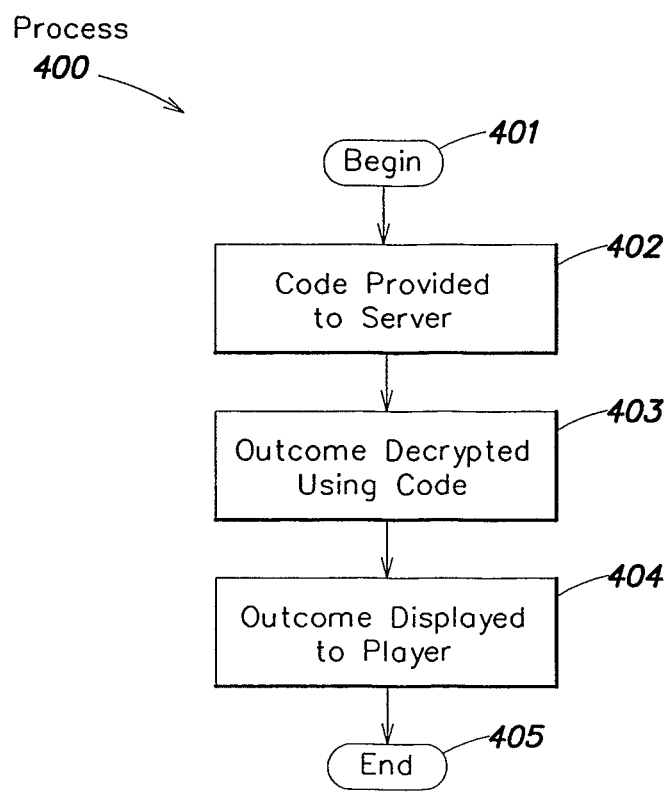
FIG. 4 is a flow chart of a process for conducting a game according to another embodiment of the present invention.

A process for performing secure access to outcomes is shown in FIG. 4. At block 401, process 400 begins. A server (e.g., server 103) may store a number of outcomes in encrypted form, each of which outcomes can be accessed by a respective code. These outcomes may be encrypted, for example, using any encryption method (e.g., symmetric, asymmetric encryption) as is known in the art. At block 402, a code is provided to the server (e.g., server 103).

This code may be, for example, a secret code (e.g., a symmetric key, a private key) printed on a ticket and provided to the server by a user through an interface of a computer system as discussed above. The received code may be transmitted between systems using a secure transmission method (e.g., SSL) as is known in the art. The received code is used at block 403 to decrypt the outcome stored on the server. This code may be any decryption key type that may be used to decode data, and may be of any format or length. The decrypted outcome may then be presented to a player at block 405. The outcome may be displayed using any method. For example, as discussed above, the outcome may be presented through one or more reveals presented to the player during play of an online game. At block 405, process 400 ends.

Another aspect of the present invention relates to a lottery-based software game that can be played over a network, such as the Internet. According to one embodiment, the system includes a purchase of a scratch-based or printed ticket by a player at a point of service (POS). A POS may be, for example, a place at which lottery tickets may be sold, including convenience stores or other locations where lottery products are provided. In an alternative system provided at a casino or other gaming establishment, a ticket may be sold to a player at the casino for play at a later time.

The player receives the ticket at the POS or other location, and proceeds to play a computer-based game at another location to reveal a result (or outcome) of the game. The computer-based game may be, for example, a casino-type game (e.g. slot machine, video poker) or other type of game, including amusement games or games of chance. In the case of the scratch or printed ticket, the result is not apparent to the player until the player plays the computer-based game. This game may be, for example, a software program that is downloaded and played over the Internet. Alternatively, other ways of accessing the online portion of the game may be used (e.g., PDA, cell phone or other method).

The ticket includes a code by which a player gains access to a result stored on a server that stores ticket information and results associated with each ticket. Such information may be predetermined at the time of ticket sale, or the results may not be known until a later time, after the ticket is issued to the player (e.g., in the case of a Keno, bingo, or other drawing-based system). According to one embodiment, the code is an access key (or a portion thereof) that is used to access the result stored on the server. Further, the result (stored in the server) may be encrypted. For example, the code may be a private key or a symmetric key. The key may be transmitted by a client computer system to the server for the purpose of decrypting the result using SSL or any other secure method.

Because the decryption key is stored on the ticket, the gaming system is safer, as a breach of security of either the tickets or the server does not provide access to result information. More particularly, access to the lottery ticket database may not be accomplished without the ticket (used to decrypt the result). Further, the tickets may not be correlated to results without the lottery ticket database (because the results are stored in the database, not on the tickets).

In another example of the system, a portion of the key used to decrypt results of the game is stored on the ticket, and another portion is stored in the database of the server. In this manner, it is assured that possession of either portion of the key may not compromise the results.

However, it should be appreciated that the system does not require SSL or any other encryption/decryption method, a decryption key on the ticket, or the stored result on the server to be encrypted. Rather, the game can be implemented with or without these features. That is, access to the outcome stored at the server may be performed using only the serial number or other ticket identifier printed on the ticket.

The scratch-based or printed ticket also includes a second serial number or other identifier (e.g., an access code) in addition to the serial number or other identifier which is correlated to results on the server. A ticket may include both a serial number and a ticket identifier used by the system. According to one embodiment, it is appreciated that there may be security issues with using the serial number of a printed ticket (as printed on the ticket) to correlate to win outcomes. That is, the lottery provider may not allow any entity outside of the lottery system to have the ability to correlate outcomes to serial numbers. To this end, another identifier (e.g., a separate ticket identifier or access code) may be provided on a ticket to allow the system to index into an outcome database.

In one example system that works in association with a lottery system, outcomes for a game may be predetermined to comply with lottery rules. In this case, outcomes are predetermined and stored in a database. In an alternative environment where results are not permitted to be predetermined (e.g., in a casino), but rather are determined at a later time (e.g., by a drawing or other method), a ticket issued by a system in such an environment may have an associated drawing time when a game may be played. In the case where the online game system is driven by a Keno game result, each ticket may be associated with a set of numbers in the Keno game, and the result of the Keno game is provided as the result for the online game. In one example, a computer system automatically picks numbers associated with the ticket at the point when the ticket is issued. Thereafter, when the Keno game occurs, the result of the Keno draw is provided to an online game system, which translates the Keno result to a game experience within another game (e.g., PAC-MAN-type game, slot machine, etc.). It should be appreciated, however, that although the game of Keno may be used to drive an online game experience, other games (e.g., bingo) may be used.

The server (e.g., server 103) may be capable of accepting, from the user, an input of the serial number and decryption key, and in response, providing the results associated with the particular ticket. The result or outcome of the game may be displayed to the player in an interface of the computer system (e.g., a client computer system such as a personal computer (PC)) used to play the computer-based game. For example, the outcome of a series of plays associated with the ticket may be stored in the server, and provided to the client, and the series of outcomes may be presented to the player during play of the computer-based game.

In another embodiment of the system, a payout of the ticket may be encoded on the ticket. For instance, if the ticket is a $5 winner, the amount of the win may be encoded on the ticket. In the case of the casino-based version of the system, the payout may not be stored on the ticket (as the payout is not predetermined), but rather the purchase price of the ticket may be stored on the ticket, or some other identifier of the ticket.

Figure 5:
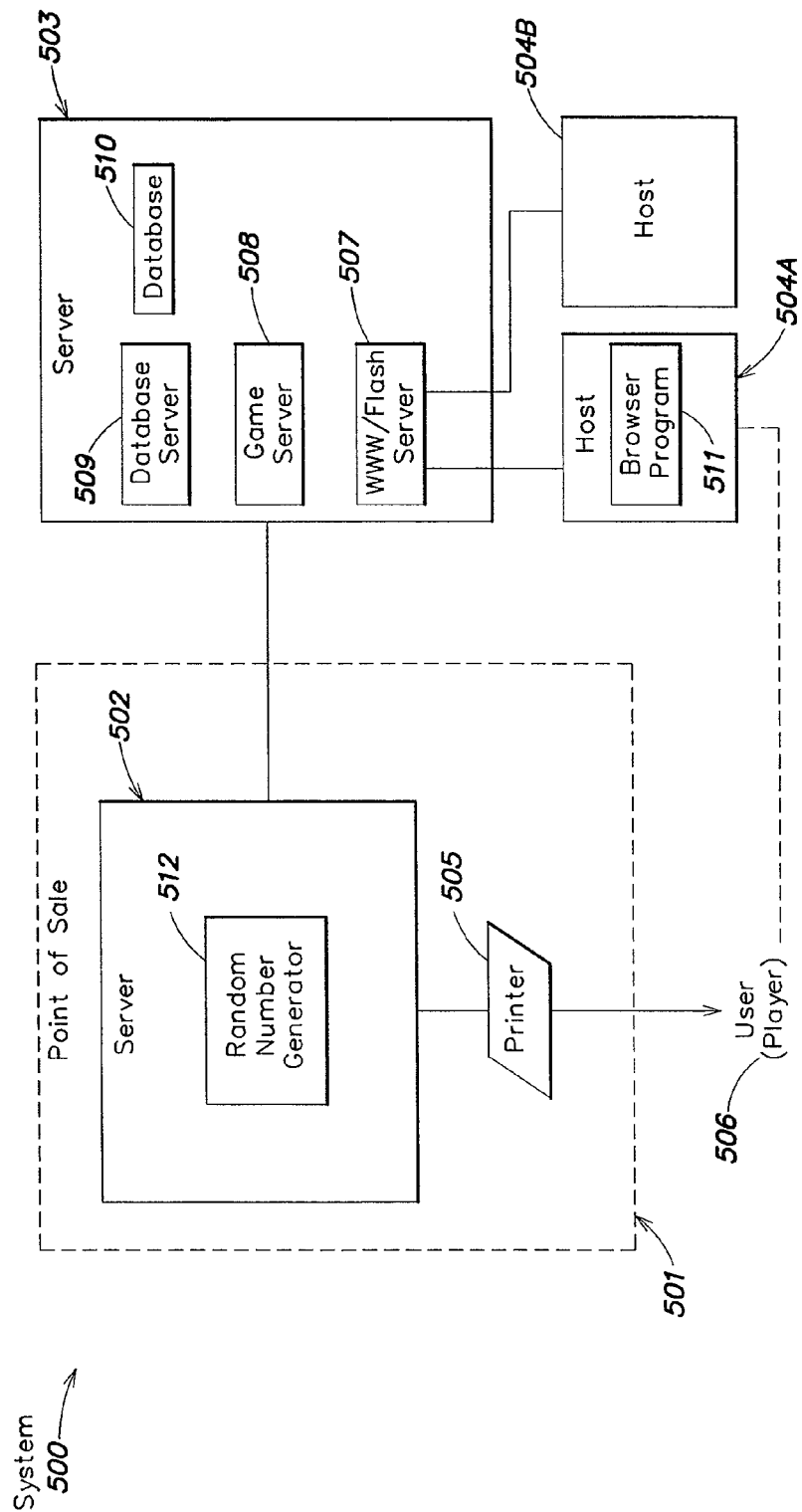
FIG. 5 is a system for conducting a game according to according to one embodiment of the present invention.

As shown in FIG. 5, a system 500 may be provided having more than one server. For instance, a server 502 provided at the point of sale 501 is primarily responsible with issuing tickets to a user/player 506. To this end, server 502 may issue preprinted tickets or may issue tickets printed from an associated printer 505. Such tickets may include one or more identifiers as discussed above with reference to FIG. 2. As discussed, another system such as a Keno or lottery-based system may be used to provide results to an online game system.

In one version of system 500, the win/loss determination of a ticket may be driven by a later-occurring drawing. For example, a Keno-based, bingo-based, or other type lottery draw system may be used wherein the outcome of a particular game is not known until a future time (e.g., when a drawing occurs). In this case, the ticket identifier stored on the ticket may be an access code generated from ticket identifiers in the Keno-based system (e.g., by an intermediate system or the Keno server itself that can translate a Keno ticket identifier into another type of identifier).

Generation of an identifier separate from the Keno ticket identifier may be necessary for security reasons relating to the Keno system. More particularly, access to the Keno ticket identifiers may not be permitted by the system (e.g., the Keno server). In one example, a Keno system translates Keno ticket identifiers into access codes and results that are stored on the game server (e.g., server 503). Thereafter, clients (e.g., hosts 504A, 504B) access results stored on the server based on their respective access codes.

As discussed above, one or more hosts 504A, 504B (e.g., general purpose computer systems) may communicate with a server 503 over a network for the purpose of conducting a game. In one example, a host 504A renders a browser window by executing a browser program (e.g., the Internet Explorer browser program available from the Microsoft Corporation). A user/player 506 enters a URL address specified by an issued ticket in a window of the browser interface, and is directed to a website associated with server 503. This website may be rendered by, for example, a WWW server process (e.g., server 507) associated with server 503.

Player 506 may be instructed to enter an access code (and/or any other required information) to access one or more games in an interface presented through the browser. As discussed, server 503 may validate the received access code, and provide any results stored in a database associated with server 510. Once validated by server 503, the user may be permitted to play one or more games. These game may be, for example, be programmed using one or more programming languages (e.g., Macromedia Flash) and may be downloaded to host 504A and executed.

According to one aspect of the present invention, it may be beneficial to provide a game program that may be downloaded quickly to a client and played by a player without requiring any installation procedure, requiring operator (player) intervention, or delays in downloading large files. To this end, the game program may be programmed in a language supported by a majority of game playing systems (e.g., Macromedia Flash, etc.), and played without the need for downloading and installing large software components. In one specific example, the game program may execute within a browser program (e.g., the Microsoft Explorer browser program) window. In this manner, less-sophisticated players who have difficulty using computers and/or installing software may not be prohibited from playing the game. Of course, it should be appreciated that any programming method may be used that requires or does not require any installation procedure, and the invention is not limited to any particular programming method.

Also, outcomes associated with any games may be downloaded prior to game play. As discussed, examples of games include those that may be of the lottery-type (e.g., having a predetermined outcome) and those that are casino-based (e.g., having an outcome that is not determined at the time of sale of the ticket). In the case where a later drawing affects an outcome, a player may not be permitted to play the game until the drawing occurs (and until results are available at server 503). In the case of a drawing that affects outcomes, drawing results can be communicated from server 502 to server 503. In addition, server 502 may maintain a mapping from a ticket identifier (e.g., a serial number) to an access code provided on the ticket, and provide a mapping of outcome to access code when the drawing occurs. As discussed, such outcome information may be maintained in a database 510 associated with server 503 and may be accessed through a database server process 509.

As discussed, the payout of the lottery ticket may be displayed to a player in a number of ways. For instance, the payout of the ticket may be presented to the player through one or more reveals presented to a player during one or more plays of an online game.

For instance, in the case of a slot machine game, a player may be permitted, with the issue of a single scratch or printed ticket, a series of spins of the slot machine. The slot machine may, as the result of each of the spins, produce results that contribute to the overall payout to the player. For instance, after a single spin, a player may be presented an indication that he/she has won $5. The payout to the player as provided from the server database may be, for the series of spins, $50 overall, with particular outcomes for each spin. Additional spin results may provide the additional $45 that the player will receive. Additional spins may add, subtract, or have no affect on the contribution to the outcome of the game. These results of each spin of the slot machine game may be stored in the database of the server indexed by the ticket identifier, or may be randomly determined by the game program that renders the game. Further, as discussed above, the results of each spin may be "scripted" such that the game experience is more exciting to the player.

For example, in the case where the results of each spin are stored on the server, the series of results may be downloaded to the client at the beginning of the game as a series of entries, and the client may reveal each result as the player progresses through the series of spins. In the random method, results for each individual spin are not predetermined, but rather are determined by the client in a random manner. For instance, the actual outcomes of each spin may be randomly chosen among the possible combination of outcomes that may produce the required payout. In either case, the outcomes for each spin of the slot machine game is not stored on the ticket, but rather is stored at the server and downloaded just prior or during game play, or is determined randomly by the client. Alternatively, the client may determine the game experience based on a predetermined set of rules or formulas that, when an overall outcome is provided, allows the client to determine intermediate outcomes in a dynamic way.

Because the game play and outcome are scripted, a player may also not play the game (and possible secondary games) to actually win. A player may purchase a ticket, wait until the ticket may be redeemed, and go to a POS to find out (and if necessary, receive) his/her winnings. A ticket may be allowed to be redeemed after a predetermined period of time after the drawing independent of whether the player has played the game. A ticket may be able to be redeemed after a predetermined period of time, from almost immediately to seconds to days or any predetermined time. For tickets with results dependent upon results of a particular Keno game or other event, the ticket may not be redeemed until after the event has passed.

Finally, after play of the online game, the player is permitted to validate the ticket at any POS location (e.g., 501 (for example, a lottery agent, casino, or other gaming establishment) to redeem his/her winnings as indicated during the online portion of the game. According to one embodiment, players are permitted to redeem their winnings only after playing the online portion of the game. The player, by playing the online portion of the game, sets status information at the server (e.g., server 503). When the player attempts to redeem the ticket at the POS (e.g., 501), the status information may be checked, and the player is permitted to redeem his/her winnings. To this end, server 503 may communicate information back to server 502 relating to game play.

For instance, server 503 may collect information that indicates the sequence of game play performed at the client, and other player tracking information. In one example, tickets may be associated with a particular player, and the player may be awarded loyalty points or other credit for playing the game.

Taking a PAC-MAN-type game, a player is issued a ticket at a POS to play one or more instances of the PAC-MAN-type game. The ticket indicates an access code, and the player uses this access code to gain access to the system (e.g., from a host coupled to server 503 through the Internet). The player enters the access code in a user interface, and, once validated, is permitted to play the PAC-MAN-type game. As discussed, the PAC-MAN-type game is a version of the well-known game of PAC-MAN, which is a game of skill-based game. It should be appreciated, however, that any similar game may be used, having different characters, objects, player representations, etc. and the invention is not limited to the original PAC-MAN game or any of its variations.

Optionally, the player is permitted to play, based on a single access code (and ticket), any one of a number of games available from server 503. Such an option may allow a player to play different games for each game instance associated with the ticket.

Figure 6:
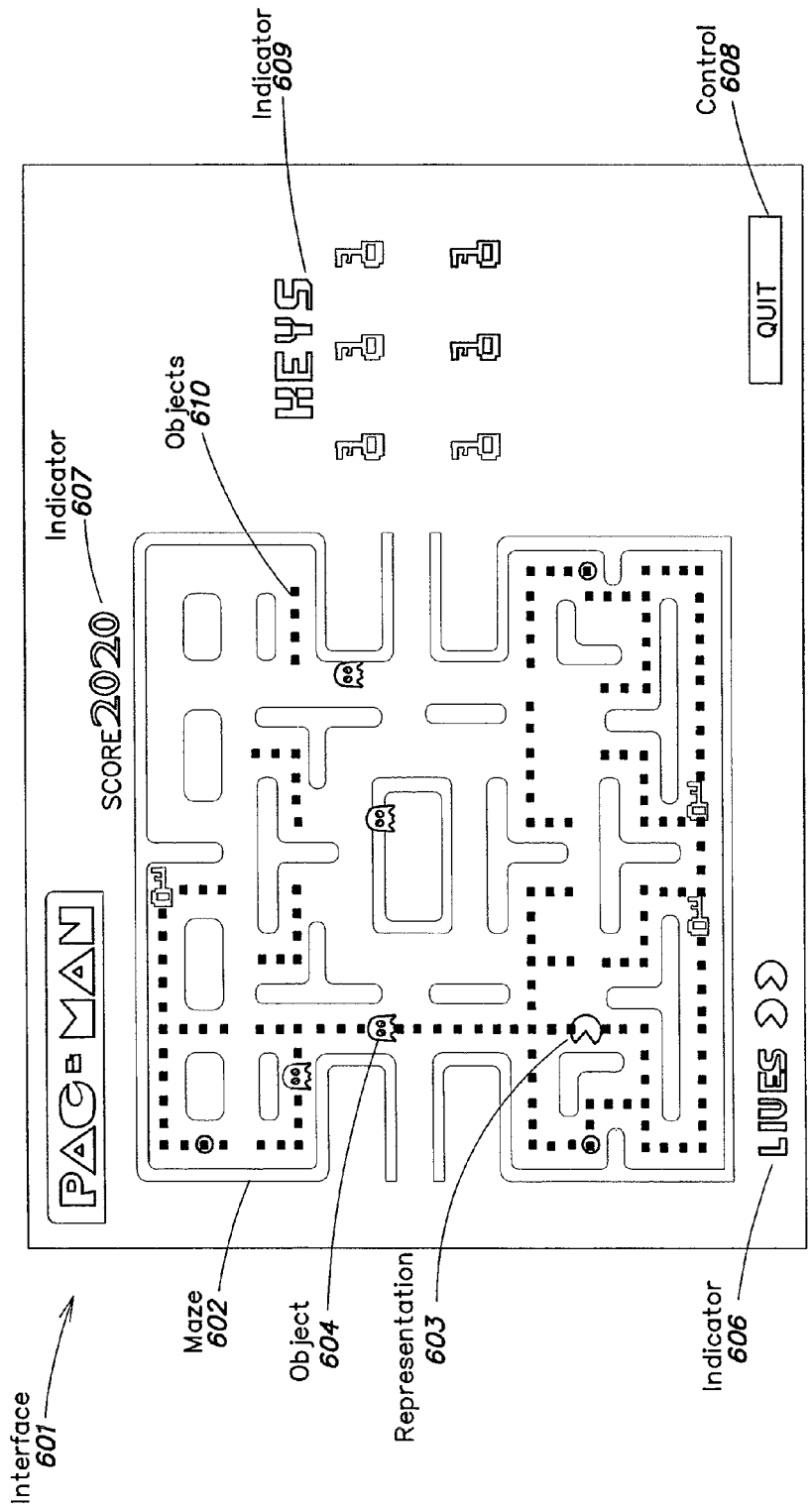
FIG. 6 is a game interface according to one embodiment of the present invention.

FIG. 6 shows an example game interface 600 according to one embodiment of the present invention. According to one embodiment of the present invention, the PAC-MAN-type game includes a two-level game having an interface 601 that shows the first level game. In one example, the first level game includes one or more mazes 603 having items that are collected or "eaten" by a PAC-MAN character or other player representation. The player, operating a control (e.g., keyboard, joystick, mouse, or other device) moves the player representation around the maze, collecting objects to obtain points. According to one embodiment of the present invention, the player collects items for use in a second level game.

In the traditional PAC-MAN game, objects eaten are associated with points that, when the objects are eaten, the player is awarded points. According to one aspect of the present invention, one or more win opportunities are associated with respective objects positioned in a game maze. The player, by obtaining these objects, is provided respective win opportunities. These win opportunities may be presented to the player in a second level game.

In the traditional PAC-MAC-type game, the player may be provided a finite number (e.g., three (3) lives) at the beginning of a particular game instance. As in traditional PAC-MAN-type games, there may be one or more objects (e.g., antagonist objects such as ghost objects) that, when touched by the player representation (e.g., representation 603) cause the player to lose a life. An indication of remaining lives for the player may be presented in interface 601 by indicator 606. The player may, in one example, be permitted to obtain additional lives during play of the game. The first level may include other aspects similar to other aspects of the traditional game of PAC-MAN, such as "power pills" that, when eaten, permit the player representation to eat other objects (e.g., ghosts) that normally cannot be eaten during regular play.

Interface 601 may also include a number of controls to assist the player in playing the PAC-MAN-type game. For instance, a control 608 (e.g., a "QUIT" button) may, when activated by the player quits the PAC-MAN-type game, allowing the player to proceed to the second level game. In another embodiment, selection of control 608 causes the game instance to be terminated, and any prizes associated with that game instance to be revealed to the player.

Maze 602 also includes objects (e.g., a representation of a key) that indicate an item to be used in a second level game. Collectively, items such as keys may be used in a second level game as discussed further below. An indicator 604 may be provided in interface 601 to track the number of items collected. Although items associated with a second level may be associated with key objects, it should be appreciated that any object type may be associated with items for use in a second level game.

The first level game ends when the player has no additional lives remaining. Alternatively, the game program may have a finite number of levels of the PAC-MAN game (within the first level game) that the player can play. There may be other limitations in playing the first level game, including time, number of points, or other limitation that determines when the first level game is ended. Alternatively, the player may select control 608, which, according to one example, terminates the first level game and causes the game to proceed to the second level game. That is, selection by the player of one type of control permits the player to bypass play of the first level game.

Prizes may be awarded in the first level game, the second level game, or both. In one example, one or more win opportunities may be associated with the first level game. The win opportunities may be revealed to the player when, for example, a particular object or set of objects is eaten, a particular point total is achieved, or other aspect is achieved in any of the game, either collectively or individually. Also, in interface 601, there may be an indicator that shows the player any prizes he/she may have won during play of the first level game. As discussed above, results of win opportunities may be stored in a server and downloaded to a game-playing computer system prior to play of the game, may be determined dynamically by the game-playing computer system, or may be determined in any other manner.

However, it should be appreciated that although PAC-MAN-type games are games of skill, the play of the PAC-MAN-type game does not affect the prize awarded to the player. Rather, the play of the PAC-MAN-type game is independent of the prizes awarded to the player which are revealed to the player during the play of the PAC-MAN-type game.

Figure 7:
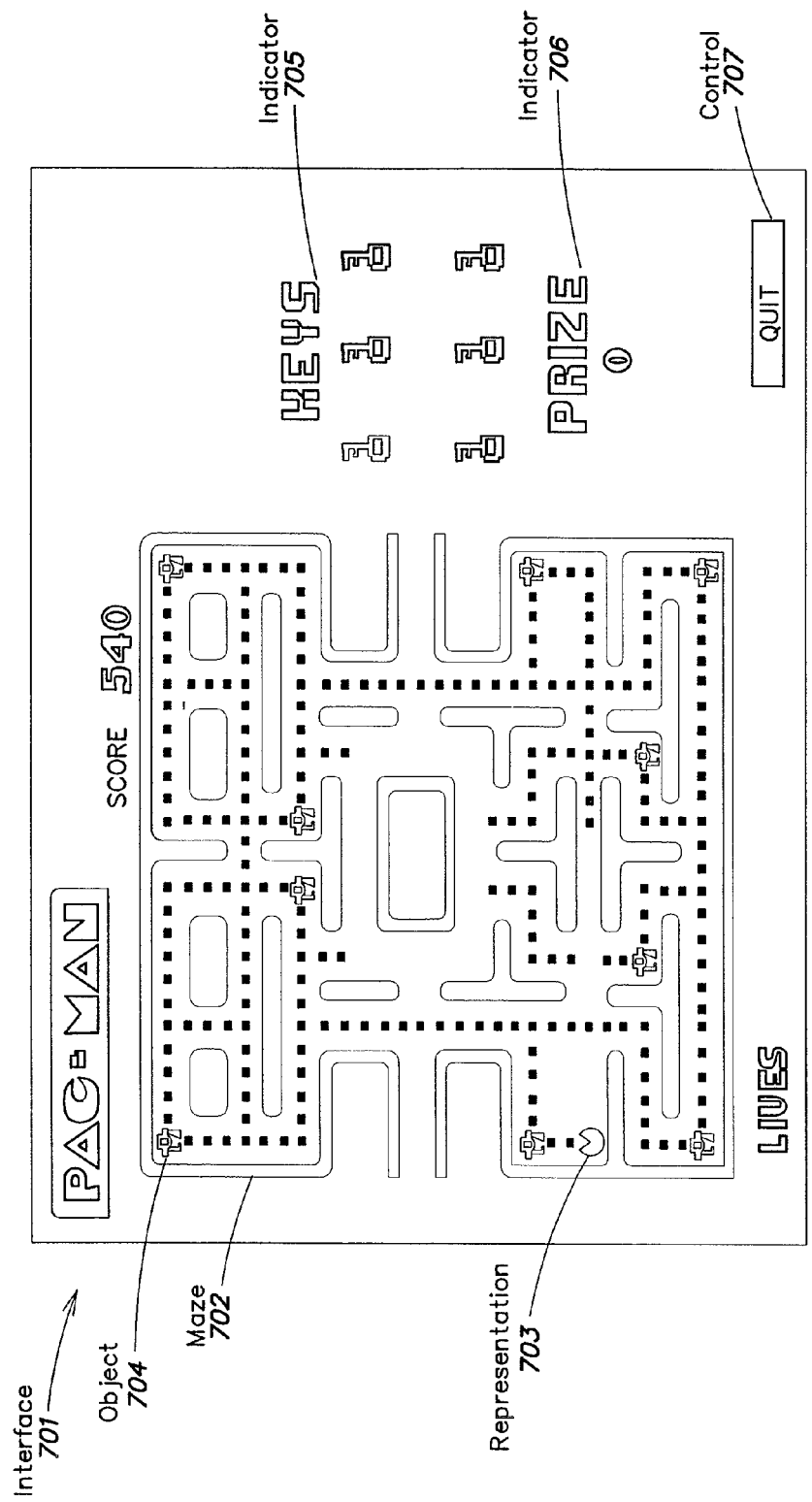
FIG. 7 is a game interface according to another embodiment of the present invention.

In one example game, prize values are associated with each of the items, and prizes are awarded (or not) in the second level game. FIG. 7 shows an example game interface 701 associated with a second level game according to one embodiment of the present invention. In the second level game, a maze 702 may be used which is similar to maze 602 used in the first level game. However, a different maze may be used, or objects may be positioned in the interface without a maze at all. Second level interface 701 may be shown within the same (e.g., in a same window, screen, etc.) interface as interface 601. Alternatively, the second level game interface 701 may be presented in a different interface of the game-playing computer system.

In one embodiment, the second level game includes a pay table that associates items collected in the first level game to prizes that may be potentially won in the second level game. For instance, particular outcomes as represented in the pay table may be associated with items collected during the first level game. In one example interface, the player may be presented a group of objects (e.g., object 704) that, unlike the first level PAC-MAN-type game having dots, power-pills, ghosts, and other objects that prohibit or impede the player representation from obtaining particular objects, includes one or more hidden prizes among objects (e.g., object 704) presented in the second level game interface. These objects may be, for example, treasure chest objects that, when opened, provide an indication of whether the player wins a prize.

The player may be permitted to select one or more of the objects in second level game interface 701. In one example, the player moves a player representation (e.g., representation 703) in a similar manner as described above with reference to FIG. 6, and selects objects by running through the object. The second level game interface may also include an indication (e.g., indicator 705) of the keys or other items remaining to be played by the player in the second level game. The second level game interface may also include an indication (e.g., indicator 706) of the total prizes won by the player during the play of the second level game.

When selected, the object shows to the player the particular prize that is hidden (or not). If the object matches an entry in the pay table, the player wins the corresponding prize indicated by the pay table. If not, the player does not win any prize associated with that game instance. In one example, the player may be permitted to select one object among all of the objects presented in the second level game interface. However, it should be appreciated that the player may be permitted to select more than one object.

According to one embodiment, the player is permitted to select the same number of objects in the second level game interface as the number of keys or other items collected in the first level game. For instance, in a first level game, the player may be permitted to obtain a maximum number of six (6) keys for use in a second level game. The second level game may have finite number (e.g., twelve (12)) objects among which the player may choose to "unlock" using the keys collected in the first level game. Optimally, the number of objects from which the player chooses is large enough that the outcome can be adjusted depending on what object the player chooses, but small enough that the player does not feel that the chance of winning the second level game is small and not affected by player choice. The second level game is ended when the player exhausts the keys obtained in the first level game. Alternatively, the player may choose to end the second level game by selecting a quit control (e.g., control 707), after which any prizes may be revealed to the player.

According to one aspect of the present invention, the player is permitted to select one or more of the objects. Upon selection of the final object, the rest of the objects are revealed to show any hidden prizes. According to one aspect of the present invention, the player is presented an indication of a "near miss", in that one or more objects selected is close to a winning object.

As it is understood that the player may select any object within the second level game, prizes associated with unselected objects revealed to the player upon selection of the final object may be varied to create the indication of the near miss. For instance, the game playing system may determine a presentation of one or more prizes in unselected objects so that the player feels that he/she lost by a narrow margin (e.g., by selecting the wrong object). Rather, the outcome of the selection according to one embodiment is predetermined. That is, the player may select any object and still obtain the same result. The revealed prize distribution among the objects presented to the player may be different, however, depending on the objects chosen by the player. In this manner, the player feels as if the objects (and therefore their corresponding prizes) are predetermined, and that their selection of a particular object had an affect on the outcome of the second level game. However, the player's selection has no affect on the outcome of the second level game according to one embodiment of the present invention.

After play of the second level game, game play is returned to another instance of the first level game (e.g., the PAC-MAN-type game). The player may, however, choose to play a different game (e.g., a card game or other game) at the conclusion of any particular game instance. The player may be permitted to play further instances of the PAC-MAN-type game, with each level of the PAC-MAN-type game leading to a second level wherein prizes are revealed. These intermediate prize amounts that are revealed with each instance of the PAC-MAN-type game, as discussed above, may be stored in a database of the server, and provided to the client prior to or during game play. Alternatively, intermediate prize amounts may be determined at the client in a random manner (e.g., by randomly selecting a possible combination of intermediate prize amounts that total the overall prize awarded to the player). In another example, a game may be determined dynamically by the game system or client based on one or more rules. These rules may be tailored so that the overall result is revealed by the game system in an interesting way.

For instance, the ticket may have an overall prize value of $50, and the prize awarded at each instance of the PAC-MAN-type game may accumulate to form the $50 prize. There may be a finite number of combinations based on the number of game instances to achieve a $50 prize, and the actual game experience presented to the player may be a random selection of the finite outcomes. In any case, the result of each game instance is either stored at the server or is determined randomly or dynamically by the client as discussed above.

According to one aspect of the present invention, it is realized that the time at which tickets are activated (and therefore, may be played) is important. In the case of a casino-based game, where tickets are issued at the casino, it may be beneficial to include a delay between the purchase of a ticket and a possible redemption of the ticket so that the game play associated with the ticket does not compete against other games offered by the casino (e.g., floor games). For example, in the case of a slot machine game, it may be preferable that such a game be activated after the player leaves the casino, or otherwise is not playable while in the casino so as not to compete with other types of slot machine games or other game types offered by the casino.

Further, another benefit of introducing a delay between ticket issuance and activation includes increasing the likelihood that the player plays the game at another location (e.g., at home), requiring the return of the player to the ticket redemption location to redeem his/her winnings. Because the player needs to return to the redemption location (which may be a casino), the possibility that the player will purchase additional tickets or play other types of games offered at the redemption location is increased.

According to one embodiment of the present invention, a PAC-MAN-type game is conducted that may include the following additional aspects, either alone or in combination:

- The player chooses his/her level of difficulty (e.g., easy, normal, hard) by selecting an appropriate button. Upon selecting the level type, the first level game is started.
- In one example game format, there is only one maze (e.g., the well-known blue first level maze of the original PAC-MAN game) and the maze remains the same, regardless of difficulty. Difficulty, instead, may be changed by adjusting how quickly the ghosts chase the PAC-MAN representation and how slowly the player representation can move to get away.
- According to one embodiment, the first level game plays with many of the same characteristics as the original arcade release of the original PAC-MAN game, including differences in antagonist (e.g., ghost) behaviors, power-up pill objects, and prize point fruit objects.
- In an alternative embodiment, the first level game is played in a sea environment, with characters and objects relating to sea elements. For instance, the PAC-MAN player representation may be replaced with a fish, and the ghost antagonists may be replaced by squids. In one specific game play example, squids may become paralyzed when the fish player representation eats a power-up pill object. Other types of objects and characters may be used, and the invention is not limited to any particular set of objects and characters. However, according to one embodiment, it is appreciated that games may be easily re-branded for use with different applications (e.g., lottery, casino, etc.), and characters and objects may be easily substituted. In this manner, the cost of developing "new" games is decreased, as graphic elements may be replaced, but the underlying game program that controls the game remains relatively unchanged.
- Players may use the arrow keys (A-S-D-W keys), the mouse, or other device to control motions of the player representation. The mouse may be used, for example, by placing the cursor in the maze in front of the player representation, and the representation turns in the best direction of the mouse. According to one embodiment, a player is not asked to choose their method of control, but rather, the game program automatically detects the method the player is trying to use.
- The first level game begins with three (3) lives awarded to the player.
- In one example, the player earns an extra life with every 2,000 points earned.
- Unlike the original PAC-MAN-type games, there is no "Continue" feature to continue game play. Rather, according to one embodiment, once the lives are gone, a second level game (e.g., a prize round) begins.
- In the first level game, there are items positioned throughout the maze.
    - The player starts the first level game with one item already awarded (to assure progression to the second level game).
    - In one example, the item is represented by a key icon.
    - There are a total of six (6) possible items to collect.
- By obtaining a score of 10,000 points, or by obtaining all of the keys, the player progresses to a reward animation, followed by a second level game (e.g., a prize round) interface that presents the second level game.
    - In one example, scoring in the first level game is consistent with the original PAC-MAN game play.
    - In another example, prize fruit in the maze changes after each time PAC-MAN player representation eats it, increasing the chances to gain more points.
    - According to another aspect of the invention, player scores are recorded, and at the end of the game, the player is permitted to submit their initials and their score for others to see in a top player list which scrolls through at the beginning of the game. According to one embodiment, access to this high score list is shared among players that play their individual games. This high score list may be maintained, for example, on a server system and downloaded to a game playing computer system before, during, and/or after play of the game. Attaining one of these high scores is yet another incentive for continued play of the game, in addition to winning any prizes. Thus, the result of a primary game (e.g., a lottery game) is combined with a multiplayer online game, the play of each game instance reveals the result of each of the player's individual secondary games (e.g., a lottery game).
- The options screen represents the classic arcade screen of the original PAC-MAC game, with the following modifications: Def Screen/Help on using game controls, select difficulty level (easy, normal, hard), and a scrolling top player high scores list.
- The player is permitted to use a mouse, keyboard, or other input device to move the player representation in the maze.
- At the beginning of the game, the player representation begins moving from the center of the maze to the left. The player can guide the player representation in any direction within the boundaries of the maze. The representation turns that direction at the next intersection, or goes back in the opposite direction. The representation includes associated code which evaluates which direction to go at each turn.
- A PAC-MAN animation plays between the maze game and the prize round.
- In one example, the second level game includes a prize round that is played for prizes or bonus points.

A PAC-MAN player representation (e.g., representation 703) is displayed in the interface and the player guides the player representation to reveal prizes.

Twelve (12) prize icons or other object types are displayed in the interface.

The player leads the player representation to an icon using similar controls used for the first level game.

The player representation reveals as many icons as there are keys collected during play of the first level game.

Prizes or bonus points are revealed when the player representation passes through an icon and unlocks (or opens) the icon.

When player opens a many icons as there are keys, the game is over.

The total sum of prizes won is the total amount rewarded to the player.

Unopened icons are displayed to the player at the end of the game.

Aside from a limited number of keys, there are no obstacles to detour the player representation from revealing prizes during the prize round. In one example, a similar maze is used in the second level game as is used in the first level game, but, according to one embodiment, there are not any other object types in the maze (e.g., there are no dots, no power pellets, and no additional keys) other than prize reveal objects.

When the PAC-MAN-type game is completed (e.g., the player quits, achieves a particular point total or game level, etc.), the PAC-MAN-type game ends and the player proceeds to the second level game.

In one version of a second level game, the user is presented multiple objects (e.g., a prize box or other representation) distributed among a maze. In one version of the second level game, there are no barriers or other elements (e.g., ghosts) prohibiting the selection of any particular object.

The user selects a particular object, and upon selecting the object, a prize is displayed (or not) to the player. According to one embodiment, the prize displayed to the player is predetermined. That is, it does not matter which object is selected by the player—the player receives the predetermined prize.

If the value in the chosen object contains a prize, the player wins that particular prize. After the player has chosen the last object to uncover (e.g., the player has used his/her last key), the game program unlocks all remaining prize boxes (creating an exciting near-miss experience.)

In another version of the second level game, the second level game includes a selection of objects in a field of 12 spots. The player selects a maximum of six of the 12 objects, and if any prizes are revealed, the player wins the associated prizes.

In one version of the second level game, there are provided one or more objects that do not require items (e.g., keys) to open them. That is, the player may play the first level game without having to collect any items to be permitted to play the second level game. In one specific example, the player may be permitted to open two designated objects, their representations being indicative of not needing an item to open them (e.g., a treasure chest having no keyhole to accept a key). In this case, the player need not be provided a "seed" key in the first level game. Also, the player may collect items (e.g., keys) in the first level game and use them to open objects in the second level game in addition to the two "free" objects provided as discussed above.

If the player uses all his/her items without uncovering a prize, the player wins nothing.

After the player has used his/her final item, the game program uncovers all remaining objects, revealing any missed prizes. In one example, an exciting near-miss experience may be created, for instance, by showing prizes near one or more selected objects uncovered by the player. In this way, the player is provided the feeling like their selection was "close," and therefore the player is encouraged to play again. However, in this example, the prize (or not) displayed to the player is independent of the object chosen by the player, and therefore, the player's choice does not affect the outcome of the game.

At the conclusion of the second level game, the user is presented an indication that the second level game is over and an indication of any prize(s) awarded.

The overall result (e.g., payout) for purchasing a ticket may be predetermined (as in a scratch or other type of instant lottery game) or may be determined by a later event (such as a lottery, Keno, or bingo draw) that occurs after ticket issuance.

Having thus described several aspects of at least one embodiment of this invention, it is to be appreciated that various alterations, modifications and improvements will readily occur to those skilled in the art. Such alterations, modifications, and improvements are intended to be part of this disclosure, and are intended to be within the spirit and scope of the invention. Accordingly, the foregoing description is by way of example only.

What is claimed is:

1. A method for playing a game of chance comprising acts of:

issuing a ticket to a player, the ticket including a code printed on a surface of the ticket;

accepting on a server a connection request;

displaying in response to the connection request a web page;

displaying within the web page a computer-based interface configured to permit a player to access a first level game, the first level game comprising a maze game involving a collection of items positioned in a maze;

determining results of the game of chance after issuance of the ticket but prior to play of the game of chance;

accepting, by the computer-based interface, the code printed on the surface of the issued ticket, wherein the act of accepting includes an act of permitting the user to enter the code printed on the surface of the ticket into the computer-based interface;

providing security access to the web page in response to processing the code printed on the surface of the issued ticket;

displaying the first level game in response to the act of providing security access to the web page, wherein access to the first level game is restricted until security access is granted;

permitting the player to play the first level game;

obtaining the results of the game of chance using the code printed on the surface of the ticket in response to the act of providing security access to the web page;

determining an outcome of the first level game in response to the player initiating play of the first level game, wherein the first level game is configured to permit the skill of the player to determine the outcome of the first level game;

permitting the player to collect items displayed within an interface of the first level game;

permitting the player to play a second level game regardless of the outcome of the first level game;

requiring that the player use at least one of any items collected during play of the first level game in the second level game;

revealing one or more prizes during play of the second level game, wherein the act of revealing includes an act of accessing reveal elements in the second level game using the at least one of any items collected in the first level game, wherein the outcome of the first level game is independent of the act of revealing one or more prizes in the second level game; and providing the results of the game of chance through the act of revealing one or more prizes.

2. The method according to claim 1, wherein the act of issuing a ticket includes issuing at least one of a lottery ticket, a scratch ticket, and a pull-tab ticket.

3. The method according to claim 1, further comprising an act of downloading a computer-based game, wherein the act of downloading occurs in response to providing security access to the web page in response to processing the code printed on the surface of the ticket.

4. The method according to claim 3, wherein the act of obtaining the results of the game of chance further comprises an act of permitting access to the results of the game of chance by using the code as a decryption key.

5. The method according to claim 3, further comprising acts of:
storing, in a database of a computer system, a portion of a decryption key;
obtaining the portion of the decryption key from the database;
generating the decryption key from the portion of the decryption key and at least a portion of the code; and
wherein the act of obtaining the results of the game of chance includes using the decryption key by the computer system to obtain the results.

6. The method according to claim 5, further comprising an act of obtaining, from the database of the computer system, the portion of the decryption key based on an identifier printed on the ticket.

7. The method according to claim 6, wherein the identifier is a serial number associated with the ticket.

8. The method according to claim 3, further comprising an act of providing a uniform resource locator (URL) on the surface of the issued ticket, and wherein the web page is identified by the URL on the surface of the issued ticket.

9. The method according to claim 1, further comprising an act of storing, on a server, the results of the ticket-based game.

10. The method according to claim 1, further comprising an act of associating the results of the game of chance with the ticket in response to the act of issuing the ticket to the player.

11. The method according to claim 1, wherein the maze game includes a display for the second level game in which one or more prizes are revealed, and wherein the maze game includes a collection of items positioned in a maze, and the act of permitting the player to collect items displaying within an interface of the first level game, includes permitting the player to collect the items positioned in the maze.

12. The method according to claim 1, wherein the ticket discloses the number of game instances of the first level game awarded to the player.

13. The method according to claim 1, wherein a prize total for the ticket is predetermined, and the method further comprises an act of presenting the prize total as a sequence of reveals in the second level game.

14. The method according to claim 13, wherein the sequence; of reveals is predetermined.

15. The method according to claim 14, wherein the sequence of reveals is stored in a database of a server.

16. The method according to claim 13, wherein the reveals are randomly determined by the client.

17. The method according to claim 13, wherein the sequence of reveals is determined by a predetermined game script.

18. The method according to claim 17, further comprising an act of determining a predetermined game script where a magnitude of prizes awarded for reveals associated with later win opportunities are progressively greater than the magnitude of prizes associate with reveals associated with earlier win opportunities.

19. The method according to claim 17, further comprising an act of determining, for an issued ticket indicated as a losing ticket, a game script comprising an indication that the player was substantially close to winning.

20. The method according to claim 13, wherein the sequence of reveals is determined dynamically by a game playing computer system.

21. The method according to claim 1, wherein the reveal element is used by the player to reveal a prize won by the player.

22. The method according to claim 21, wherein the prize won by the player is at least one of cash, merchandise, and credit.

23. The method according to claim 21, wherein an indication of the prize won by the player is stored in a database of a server, and is downloaded to a computer presenting the computer-based game to the player.

24. The method according to claim 1, wherein the reveal element associated with the second level game is an item collected in the first level game, and wherein the method further comprises acts of:
permitting the player, in the second level game, to select among a plurality of objects;
upon selecting, by the player, a particular one of the plurality of objects, performing acts of:
if the particular one of the plurality of objects is associated with a prize, awarding the prize to the player; and
displaying an indication of the awarded prize to the player.

25. The method according to claim 24, further comprising an act of associating a set of items collected in the first level game with corresponding pay table entries in the second level game.

26. The method according to claim 25, further comprising an act of displaying, upon the selection of the particular one of the plurality of objects, a pay table entry associated with the collected item.

27. The method according to claim 24, wherein the awarded prize is predetermined.

28. The method according to claim 24, wherein the act of selecting the particular one of the plurality of objects is independent of an act of determining what prize is awarded by the act of awarding.

29. The method according to claim 1, further comprising an act of associating, with the ticket, additional opportunities to win.

30. The method according to claim 29, wherein the additional opportunities to win include one or more additional reveals of results associated with the game of chance.

31. The method according to claim 30, wherein the one or more additional reveals of results are presented during play of an online game.

32. The method according to claim 1, further comprising an act of providing, by a first server associated with the first level game, a result associated with the game of chance.

33. The method according to claim 32, wherein the first server further comprises a random number generator, and the random number generator performs an act of determining a set of numbers associated with the issued ticket.

34. The method according to claim 33, wherein the game of chance includes a least one Keno game and a bingo game, and the act of determining a set of numbers associated with the issued ticket comprises an act of selecting a predetermined number of numbers from a predetermined set of numbers.

35. The method according to claim 32, further comprising an act of determining a set of winning numbers associated with the game of chance.

36. The method according to claim 35, further comprising an act of determining the result of the game of chance based on a comparison of the set of numbers associated with the issued ticket and the set of winding numbers.

37. The method according to claim 1, wherein the code printed on the surface of the ticket is unique among indicators of a plurality of tickets.

38. The method according to claim 1, further comprising an act of permitting the player to redeem the issued ticket without playing the game on a different medium.

39. The method according to claim 38, wherein the player must wait a predetermined time period before redeeming the ticket.

40. The method according to claim 38, wherein the player must wait until a specific event has been completed before redeeming the ticket.

41. The method according to claim 38, wherein the player is permitted to redeem the ticket online.

42. The method according to claim 41, wherein the player is permitted to redeem the ticket to play one or more additional games.

43. The method according to claim 42, further comprising an act of receiving an access code for playing the one or more additional online games.

44. The method according to claim 43, wherein the access code is transmitted electronically to the player.

45. The method according to claim 1, wherein the player must wait until a specific event has been completed before gaining access to obtain results associated with the ticket.

46. The method according to claim 1, wherein the issued ticket discloses a number of game instances awarded to the player.

47. The method according to claim 1, wherein the prize total for the ticket is determined after the ticket is issued to the player.

48. The method according to claim 47, further comprising an act of determining an outcome associated with the ticket based on a drawing.

49. The method according to claim 48, further comprising an act of permitting the player to play another game in response to the act of determining the outcome.

50. The method according to claim 1, wherein the prize total for the ticket is determined prior to issuing the ticket to the player.

51. The method according to claim 1, wherein the maze game is a multiplayer game.

52. The method according to claim 1, wherein the first level game is played by at least one player over the Internet.

53. The method according to claim 1, further comprising acts of downloading a list of high scores associated with the play of the first level game and displaying the list to the player.

54. The method according to claim 1, further comprising an act of downloading a game program, the game program, when executed, renders an interface of the first level game in an interface of a game-playing computer system.

55. The method according to claim 54, wherein the game program does not require an installation of one or more components on the game-playing computer system.

56. The method according to claim 54, wherein the game program executes within a browser program window in an interface of the game-playing computer system.

57. The method according to claim 54, wherein the game program is programmed using Macromedia Flash programming.

\* \* \* \* \*